(12) United States Patent
Nishimori et al.

(10) Patent No.: US 7,653,220 B2
(45) Date of Patent: Jan. 26, 2010

(54) FACE IMAGE CREATION DEVICE AND METHOD

(75) Inventors: Takashi Nishimori, Osaka (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 10/594,297

(22) PCT Filed: Apr. 15, 2005

(86) PCT No.: PCT/JP2005/007301

§ 371 (c)(1), (2), (4) Date: Sep. 27, 2006

(87) PCT Pub. No.: WO2005/101318

PCT Pub. Date: Oct. 27, 2005

(65) Prior Publication Data

US 2007/0223827 A1  Sep. 27, 2007

(30) Foreign Application Priority Data

Apr. 15, 2004  (JP) .............................. 2004-120134

(51) Int. Cl.
*G06K 9/00* (2006.01)
(52) U.S. Cl. ...................... 382/118; 382/181
(58) Field of Classification Search .............. 382/118, 382/181
See application file for complete search history.

(56) References Cited

U.S. PATENT DOCUMENTS

| | | | |
|---|---|---|---|
| 5,870,138 A | 2/1999 | Smith et al. | |
| 6,661,906 B1 | 12/2003 | Kawade et al. | |
| 6,731,302 B1 * | 5/2004 | Cote | 345/619 |
| 6,801,641 B2 * | 10/2004 | Eraslan | 382/118 |
| 2003/0202686 A1 * | 10/2003 | Rowe | 382/118 |

FOREIGN PATENT DOCUMENTS

| | | |
|---|---|---|
| JP | 8-272948 | 10/1996 |
| JP | 8-305878 | 11/1996 |
| JP | 9-161086 | 6/1997 |
| JP | 10-240919 | 9/1998 |
| JP | 2003-271982 | 9/2003 |

* cited by examiner

Primary Examiner—Tom Y Lu

(57) ABSTRACT

A face image creation device 100 for creating a first face image where face parts for creating the first face image are arranged at positions based on a position of a corresponding face part in a second face image, comprises: a position calculation unit for extracting face parts from the input second face image and calculating the position of each face part in the second face image; a face feature storage unit for storing reference positions of the face parts in a reference image; a plot rule storage unit for storing default positions of the face parts for creating the first face image in the first face image; and a facial portrait synthesis unit for determining the positions of the face parts for creating the first face image, based on a comparison result between the calculated position of each of the face parts in the second face image and the reference position of a corresponding face part and a comparison result of a distance between default positions with a distance between reference positions for particular two face parts.

8 Claims, 20 Drawing Sheets

FIG.2

| | PHYSICAL FEATURE |
|---|---|
| EYEBROWS (LEFT AND RIGHT SEPARATELY) | PART CIRCUMSCRIBING RECTANGLE: WIDTH, HEIGHT, INCLINATION, CENTER COORDINATES |
| EYES (LEFT AND RIGHT SEPARATELY) | PART CIRCUMSCRIBING RECTANGLE: WIDTH, HEIGHT, INCLINATION, CENTER COORDINATES |
| NOSE | PART CIRCUMSCRIBING RECTANGLE: WIDTH, HEIGHT, INCLINATION, CENTER COORDINATES |
| MOUTH | PART CIRCUMSCRIBING RECTANGLE: WIDTH, HEIGHT, INCLINATION, CENTER COORDINATES |
| FACE LINE | PART CIRCUMSCRIBING RECTANGLE: WIDTH, HEIGHT, INCLINATION, CENTER COORDINATES |
| HAIR REGION | PIXELS IN THE REGION |

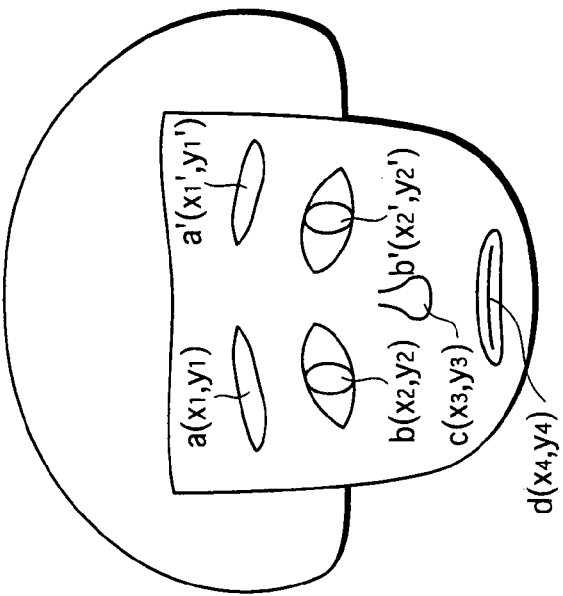

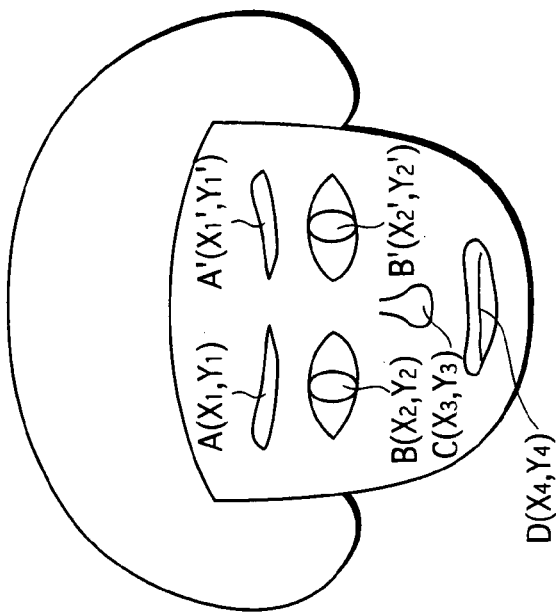

FIG.4C

| FACE PART | AMOUNT OF HORIZONTAL-DIRECTION DISPLACEMENT (d) |
|---|---|
| EYEBROWS | $\dfrac{(x_1+x_1')-(X_1+X_1')}{2}$ |
| EYES | $\dfrac{(x_2+x_2')-(X_2+X_2')}{2}$ |
| NOSE | $x_3 - X_3$ |
| MOUTH | $x_4 - X_4$ |

FIG.4D

| FACE PART | AMOUNT OF VERTICAL-DIRECTION DISPLACEMENT |
|---|---|
| [EYEBROWS] EYES | $\dfrac{(y_2-y_1)+(y_2'-y_1')}{(Y_2-Y_1)+(Y_2'-Y_1')}$ |
| [EYEBROWS] NOSE | $\dfrac{y_3-1/2(y_1+y_1')}{Y_3-1/2(Y_1+Y_1')}$ |
| [EYEBROWS] MOUTH | $\dfrac{y_4-1/2(y_1+y_1')}{Y_4-1/2(Y_1+Y_1')}$ |
| [EYES] NOSE | $\dfrac{y_3-1/2(y_2+y_2')}{Y_3-1/2(Y_2+Y_2')}$ |
| [NOSE] MOUTH | $\dfrac{y_4-y_3}{Y_4-Y_3}$ |

FIG.19

| NAME OF FACE PART | A | | |
|---|---|---|---|
| HEIGHT/WIDTH  INCLINATION | RANGE 1 | RANGE 2 | RANGE 3 |
| RANGE 4 | CATEGORY 1 | CATEGORY 2 | CATEGORY 3 |
| RANGE 5 | CATEGORY 4 | CATEGORY 5 | CATEGORY 6 |
| RANGE 6 | CATEGORY 7 | CATEGORY 8 | CATEGORY 9 |

FIG.20

| FACE PART | REFERENCE POSITION |
|---|---|
| RIGHT EYEBROW | CENTER COORDINATES ($X_1'$, $Y_1'$) |
| LEFT EYEBROW | CENTER COORDINATES ($X_1$, $Y_1$) |
| RIGHT EYE | CENTER COORDINATES ($X_2'$, $Y_2'$) |
| LEFT EYE | CENTER COORDINATES ($X_2$, $Y_2$) |
| NOSE | CENTER COORDINATES ($X_3$, $Y_3$) |
| MOUTH | CENTER COORDINATES ($X_4$, $Y_4$) |
| FACE LINE | HEIGHT, WIDTH AND CENTER COORDINATES ($X_5$, $Y_5$) |

1043

FACE IMAGE CREATION DEVICE AND METHOD

TECHNICAL FIELD

The present invention relates to technology of creating a new face image based on an input face image, especially to technology of arranging face parts for creating the new face image at positions based on the position of each face part in the input face image.

BACKGROUND ART

Conventional face image creation devices create a face image by obtaining image data of a target person's face and selecting, with respect to each face part, a piece from illustrations for a corresponding face part prerecorded in the face image creation devices, based on facial features indicated by the obtained image data.

Patent Reference 1 discloses technology for creating a face image, the expression or the image style of which is changed based on a face image obtained from a target person.

Herewith, multiple face images with different styles or different expressions can be created from a single input image, and users are therefore able to enjoy diversified and various face images.

As to the technology disclosed in Patent Reference 1, however, each time when pieces of face parts of a face image with a new expression or a new image style are added to a face image creation device, it is required, besides settings of the pieces of face parts, to set complicated rules for positioning face parts so as to reflect the positions of face parts shown in the input image on an image to be newly created. Accordingly, this causes a problem of cumbersome setting operations.

Given this factor, the present invention aims at offering a face image creation device and method thereof that enable creation of a face image based on the positions of face parts in an input face image without requiring to set complicated rules for positioning face parts.

<Patent Reference 1> Japanese Laid-Open Patent Application Publication No. H10-240919

DISCLOSURE OF THE INVENTION

In order to solve the above-mentioned conventional problem, the present invention is a face image creation device for creating a first face image in which face parts for creating the first face image are respectively arranged at positions based on a position of a corresponding each of the face parts in a second face image. The face image creation device comprises: a reception unit operable to receive an input of the second face image; a position calculation unit operable to extract each of the face parts from the input second face image and calculate the position of each of the face parts in the second face image; a reference position storage unit storing a reference position of each of the face parts in a reference face image; a default position storage unit storing a default position of each of the face parts for creating the first face image in the first face image; and a position determining unit operable to determine the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

In addition, the present invention may be a face image creation method used in a face image creation device for creating a first face image in which face parts for creating the first face image are respectively arranged at positions based on a position of a corresponding each of the face parts in a second face image. The face image creation device includes: a reference position storage unit storing a reference position of each of the face parts in a reference face image; and a default position storage unit storing a default position of each of the face parts for creating the first face image in the first face image. The face image creation method comprises steps of: receiving an input of the second face image; extracting each of the face parts from the input second face image and calculate the position of each of the face parts in the second face image; and determining the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

Additionally, the present invention may be a program for causing a face image creation device for creating a first face image in which face parts for creating the first face image are respectively arranged at positions based on a position of a corresponding each of the face parts in a second face image, to execute a face image creation process. The face image creation device includes: a reference position storage unit storing a reference position of each of the face parts in a reference face image; and a default position storage unit storing a default position of each of the face parts for creating the first face image in the first face image. The face image creation process comprises steps of: receiving an input of the second face image; extracting each of the face parts from the input second face image and calculate the position of each of the face parts in the second face image; and determining the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

Additionally, the present invention may be a computer readable recording medium storing thereon a program for causing a face image creation device for creating a first face image in which face parts for creating the first face image are respectively arranged at positions based on a position of a corresponding each of the face parts in a second face image, to execute a face image creation process. The face image creation device includes: a reference position storage unit storing a reference position of each of the face parts in a reference face image; and a default position storage unit storing a default position of each of the face parts for creating the first face image in the first face image. The face image creation process comprises steps of: receiving an input of the second face image; extracting each of the face parts from the input second face image and calculate the position of each of the face parts in the second face image; and determining the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

According to the above structure, just presetting the default positions for the respective face parts for creating the first face image enables the creation of the first face image on which a position of a corresponding each of the face parts in the input second face image is reflected. As a result, it is possible to readily create a face image based on the positions of the face parts in the input face image without requiring to set complicated rules for positioning face parts.

Here, the position determining unit includes: a displacement parameter determining subunit operable to determine a horizontal-direction displacement parameter, which is a distance in a horizontal direction between the calculated position of each of the face parts in the second face image and the reference position of a corresponding each of the face parts, and determine a vertical-direction displacement parameter, which is a ratio of (a) a distance in a vertical direction between the calculated position of one of the face parts and the calculated position of each of remaining face parts to (b) a distance in the vertical direction between the reference position of the one of the face parts and the reference position of the each of the remaining face parts; and a default position displacing subunit operable to determine, as each of the positions at which the face parts for creating the first face image are arranged, a position displaced from the default position of a corresponding each of the face parts, (i) in the horizontal direction, by a distance corresponding to a value obtained by multiplying the determined horizontal-direction displacement parameter of the corresponding each of the face parts by a ratio of a width of a circumscribing rectangle specified based on the default position of each of the face parts to a width of a circumscribing rectangle specified based on the reference position of each of the face parts, and (ii) in the vertical direction, so that a distance in the vertical direction between the default position of the one of the face parts and the default position of the each of the remaining face parts is changed to a distance corresponding to a value obtained by multiplying the distance in the vertical direction between the default positions by the vertical-direction displacement parameter determined for the one of the face parts and the each of the remaining face parts.

Herewith, by the calculation, the positional relationship of the respective face parts in the input second face image can be reflected on the positional relationship of the respective face parts in the first face image. Therefore, it is possible to create a face image on which the positional relationship of the respective face parts in the input face image has been reflected more precisely.

Here, the default position storage unit stores, with respect to each of a plurality of expression styles, a set of the face parts for creating the first face image and the default position of each of the face parts. The reception unit receives a plurality of inputs of a target person's face images with different facial expressions. The face image creation device further comprising: an extraction unit operable to extract, from each of the input face images, physical feature quantities of the face parts making up the each of the input face images; and an expression style determining unit operable to select one of the input face images as the second face image, and determine an expression style for the face parts for creating the first face image, based on a comparison result between the physical feature quantities of the face parts making up the second face image and the physical feature quantities of the face parts making up each of remaining input face images. The position determining unit determines the positions at which the face parts in the determined expression style for creating the first face image are arranged.

Herewith, a face image in an expression style corresponding to a facial expression can be automatically created by changing the facial expression in the input face image. Therefore, the user can enjoy creating face images in various expression styles by capturing and inputting face images with different facial expressions.

Here, the face image creation device includes a face image input subdevice and a face image plot subdevice. The face image input subdevice includes: the reception unit; the position calculation unit; the reference position storage unit; the displacement parameter determining subunit; a 1st transmission unit operable to transmit the determined horizontal-direction and vertical-direction displacement parameters to the face image plot subdevice; and a 1st receiving unit operable to receive the first face image transmitted from the face image plot subdevice. The face image plot device including: a 2nd receiving unit operable to receive the determined horizontal-direction and vertical-direction displacement parameters; the default position storage unit; the default position displacing subunit; a face image creation unit operable to create the first face image in which each of the face parts for creating the first face image are arranged at the position determined by the default position displacing subunit; and a 2nd transmission unit operable to transmit the created first face image to the face image input subdevice.

Herewith, it is possible to cause the face image plot subdevice to execute the face image plot process requiring a significant amount of memory. Therefore, by making a mobile device having a limited amount of memory operate as the face image input subdevice, face images in various expression styles can be also created on the mobile device.

BRIEF DESCRIPTION OF THE DRAWINGS

FIG. 2 is a table showing physical feature quantities extracted for individual face parts;

FIG. 4 shows a relationship between amounts of displacement and center coordinates;

FIG. 19 shows a specific example of a face part classification table for Face Part A; and FIG. 20 shows a specific example of center coordinates indicating reference positions for individual face parts.

BEST MODE FOR CARRYING OUT THE INVENTION

1. Embodiment 1

Structure

Next is described a face image creation device 100 according to the present embodiment.

Figure 1:
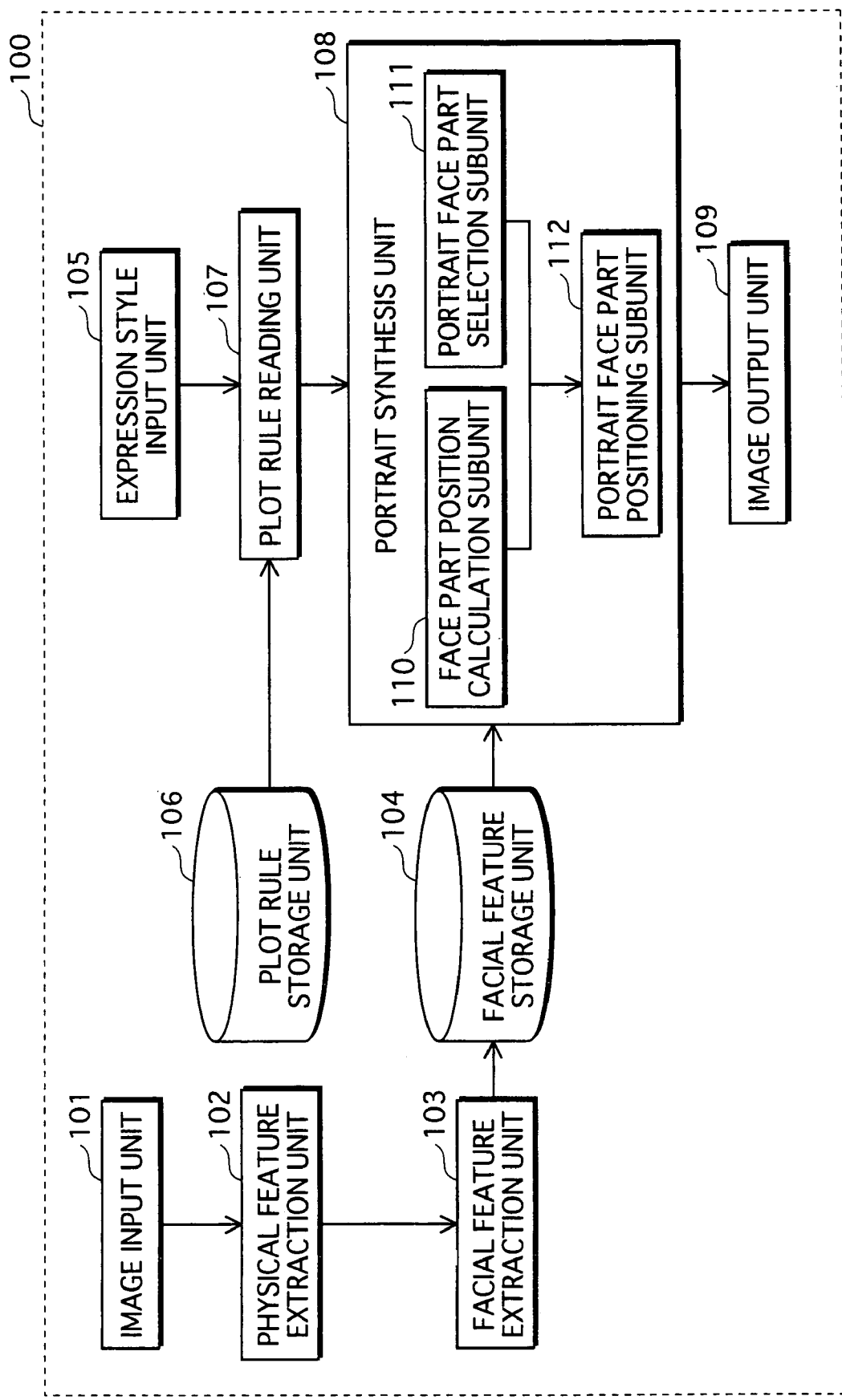
FIG. 1 is a functional block diagram showing a structure of a face image creation device 100.

FIG. 1 is a functional block diagram showing a structure of the face image creation device 100. The face image creation device 100 comprises: an image input unit 101; a physical feature extraction unit 102; a facial feature extraction unit 103; a facial feature storage unit 104; an expression style input unit 105; a plot rule storage unit 106; a plot rule reading unit 107; a portrait synthesis unit 108; and an image output unit 109.

Here, the term "portrait" refers to a face image synthesized based on the positions of individual face parts making up a target person's face image input from the image input unit 101.

The face image creation device 100 is composed of a CPU, ROM, RAM, a hard disc unit, a CD drive, removable media such as a flexible disc and a memory card, a camera, a keyboard, a mouse, a monitor and the like. Computer programs are stored in the ROM, or the hard disc unit. The CPU operates according to the computer programs, and the face image creation device 100 thereby fulfills its function. The same applies to a face image creation device 200 of Embodiment 2 to be hereinafter described.

<Image Input Unit 101>

The image input unit 101 is structured from a device operable to capture an image of an object—such as a video camera and a digital camera. The image input unit 101 takes in a face image of a target person, and converts the taken face image into face image data, which is then output to the physical feature extraction unit 102.

<Physical Feature Extraction Unit 102>

The physical feature extraction unit 102 carries out image processing on the face image data input from the image input unit 101, and extracts individual face parts. Then, the physical feature extraction unit 102 calculates physical feature quantities for each of the extracted face parts, and outputs the results to the facial feature extraction unit 103.

Specifically speaking, the physical feature extraction unit 102 extracts individual face parts' image data which is included in the face image data, and detects topmost, bottommost, leftmost and rightmost points of the individual face parts—eyebrows, eyes, nose, mouth and face line—based on the extracted image data. Then, with respect to each of the extracted face parts, the physical feature extraction unit 102 calculates, as physical feature quantities, the width, height and inclination of a rectangle, each side of which includes therein a different one of the topmost, bottommost, leftmost and rightmost points, as well as the center coordinates of the rectangle. Note that the rectangle is hereinafter referred to as "part circumscribing rectangle". Subsequently, the physical feature extraction unit 102 outputs the calculated physical feature quantities to the facial feature extraction unit 103.

In addition, with respect to hair, which is another face part, the physical feature extraction unit 102 obtains, from the corresponding extracted face part, pixel data of individual pixels making up a hair region as a physical feature quantity, and then outputs the physical feature quantity to the facial feature extraction unit 103.

A method disclosed in the patent reference of Japanese Laid-Open Patent Application Publication No. H10-255017, for example, can be employed here to extract and detect face parts.

Figure 3:
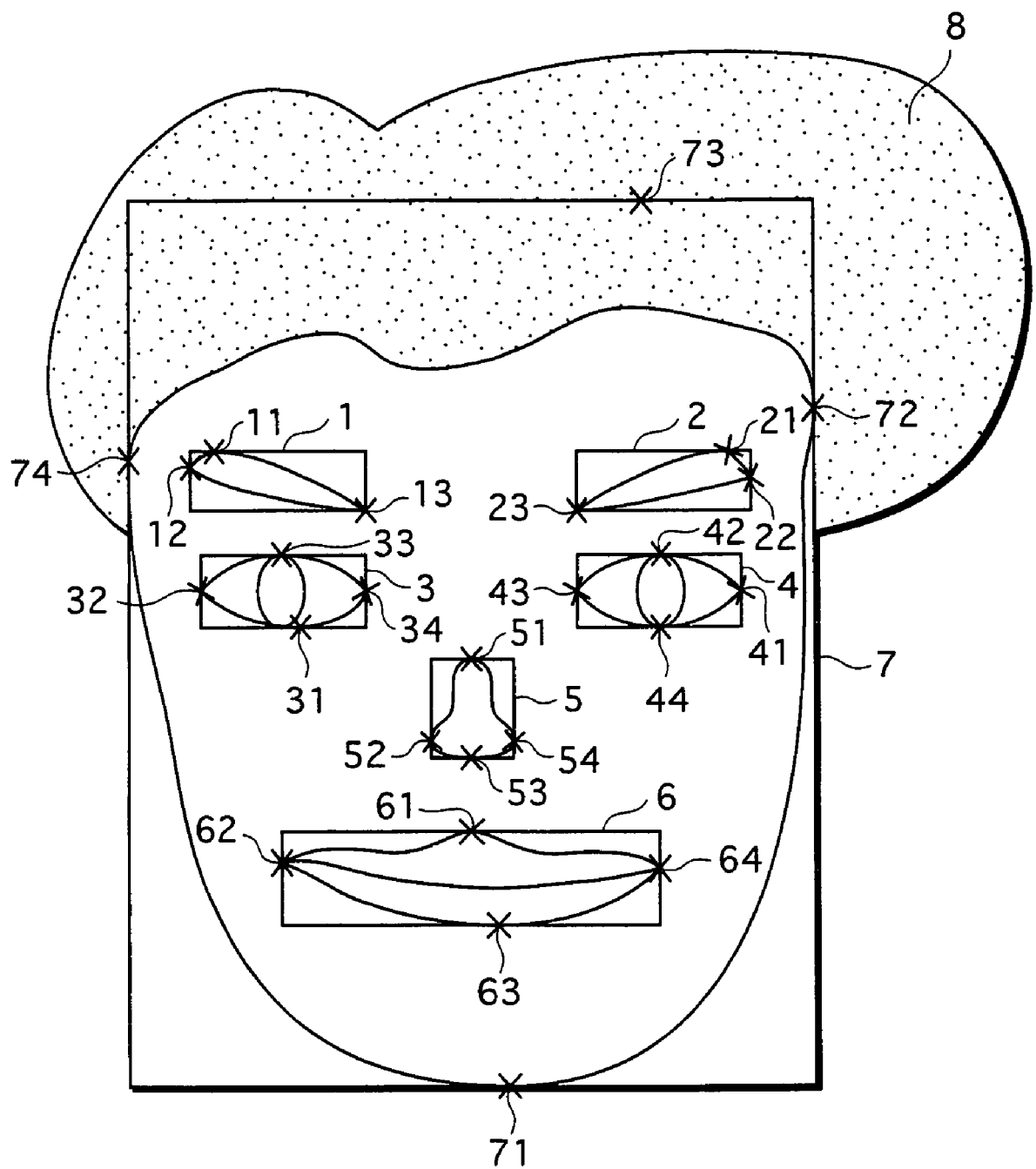
FIG. 3 is a pictorial representation showing the physical feature quantities for the individual face parts extracted from face image data.

FIG. 2 is a table showing physical feature quantities extracted for individual face parts, and FIG. 3 is a pictorial representation showing the physical feature quantities of the individual face parts extracted from the face image data.

Reference numerals 1 to 7 in FIG. 3 indicate part circumscribing rectangles of the individual face parts while reference numeral 8 indicating pixels in the hair region. Reference numerals 11, 21, 33, 42, 51, 61 and 73 indicate topmost points of the individual face parts while reference numerals 31, 44, 53, 63, 71 indicate the bottommost points. Reference numerals 12, 32, 43, 52, 62 and 74 indicate leftmost points of the individual face parts while reference numerals 22, 34, 41, 54, 64 and 72 indicate the rightmost points. Note that reference numeral 13 shows that the rightmost and bottommost points of the face part (left eyebrow) are overlapped while reference numeral 23 shows that the leftmost and bottommost points of the face part (right eyebrow) are overlapped.

Here, the "width of a part circumscribing rectangle" means a length of the base of the part circumscribing rectangle, and the "height of a part circumscribing rectangle" means a length of a vertical side of the part circumscribing rectangle. The "inclination of a part circumscribing rectangle" is an angle between (a) a straight line having its beginning at the rightmost point of the face part and its end at the leftmost point (e.g. a straight line connecting reference numerals 13 and 12 of FIG. 3) and (b) a straight line having its beginning at the rightmost point and being parallel to the base of the part circumscribing rectangle (e.g. a straight line parallel to the base, stretching from reference numeral 13 of FIG. 3 toward the side of reference numeral 12). In regard to individual right-sided face parts—i.e. the right eyebrow and right eye, the inclination of each part circumscribing rectangle is found by following the above description with the "leftmost point" and the "rightmost point" being switched.

Here, when the straight line connecting the rightmost and leftmost points makes an angle in the clockwise direction from the straight line parallel to the base, this angle is a positive angle. On the other hand, when the straight line connecting the rightmost and leftmost points makes an angle in the anticlockwise direction from the straight line parallel to the base, this angle is a negative angle.

In addition, the "center coordinates" refer to coordinates of the center point of a part circumscribing rectangle of each face part—namely, the crossing point of the diagonal lines of the part circumscribing rectangle.

<Facial Feature Storage Unit 104>

Figure 18:
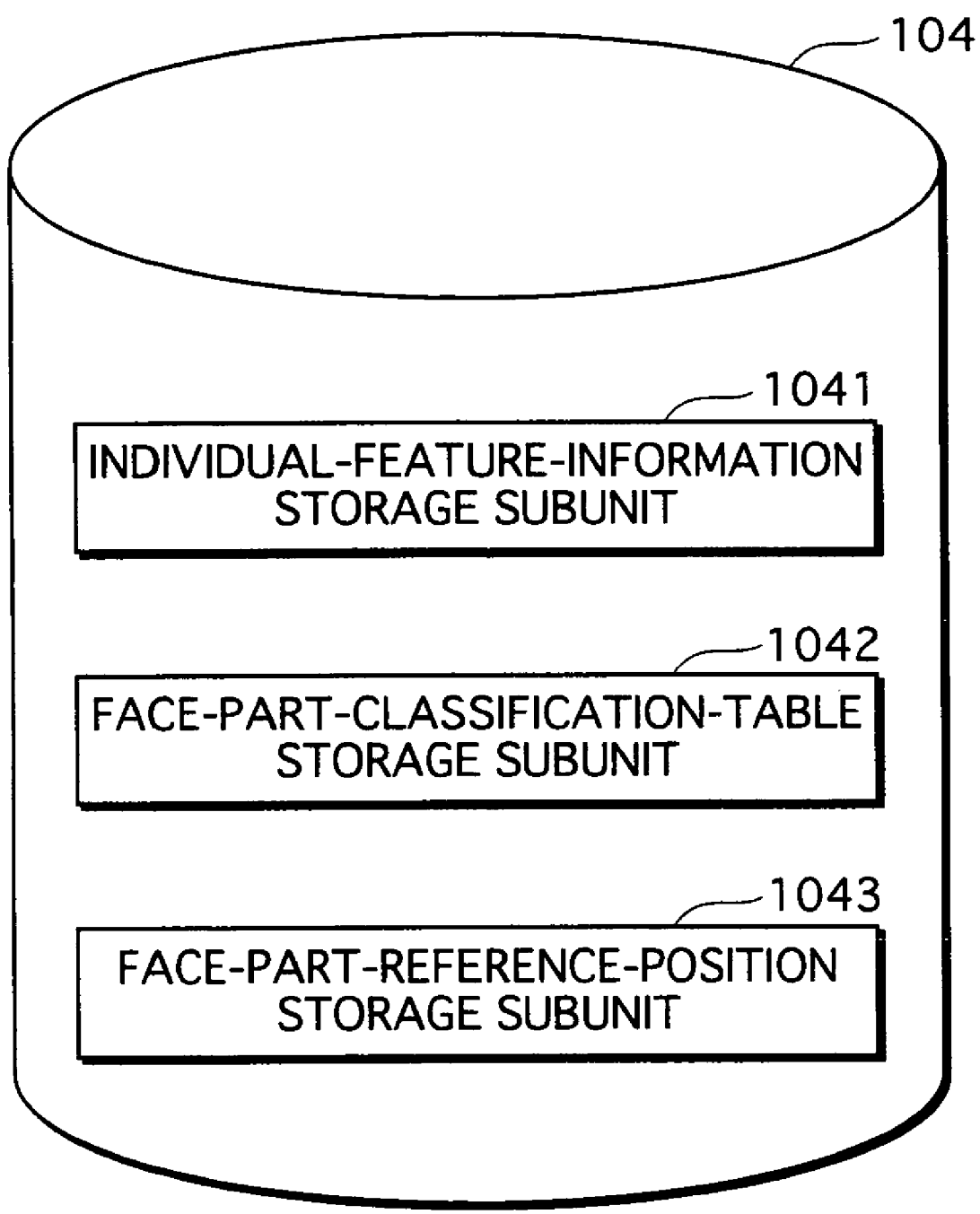
FIG. 18 is a functional block diagram showing a structure of a facial feature storage unit 104.

FIG. 18 is a functional block diagram showing a structure of the facial feature storage unit 104.

The facial feature storage unit 104 includes: an individual-feature-information storage subunit 1041; a face-part-classification-table storage subunit 1042; and a face-part-reference-position storage subunit 1043.

<Individual-Feature-Information Storage Subunit 1041>

The individual-feature-information storage subunit 1041 stores individual feature information.

Here, the term "individual feature information" refers to information including: classification categories of each face part; and amounts of displacement, each of which is calculated by the facial feature extraction unit 103 based on physical feature quantities of each face part as well as a reference position of each face part (to be described hereinafter) stored in the face-part-reference-position storage subunit 1043.

Each "amount of displacement" is composed of an amount of displacement in the horizontal direction (hereinafter, "amount of horizontal-direction displacement") and an amount of displacement in the vertical direction ("amount of vertical-direction displacement").

The "amount of horizontal-direction displacement" is a difference between an X-coordinate value (a coordinate value in the horizontal direction) of the center coordinates calculated for a face part and an X-coordinate value of the center coordinates indicating a reference position for the face part (e.g. eyes). In the case where a face part has more than one piece, such as "eyes" and "eyebrows", the difference is calculated using the average of their X-coordinate values (e.g. the average of the X-coordinate values of the left and right eyes).

The "amount of vertical-direction displacement" is a ratio of (a) a difference between a Y-coordinate value (a coordinate value in the vertical direction) of a fiducial point (e.g. the center coordinates of the eyebrows) and a Y-coordinate value of the center coordinates calculated for a face part (e.g. eyes) to (b) a difference between the Y-coordinate value of the fiducial point and a Y-coordinate value of the center coordinates indicating a reference position for the face part (eyes, in this case). In the case where a face part has more than one piece—such as "eyes" and "eyebrows", the average of their Y-coordinate values is used to calculate the differences and the ratio.

Here, the "fiducial point" refers to the center coordinates of any of the face parts located around the center coordinates of a target face part for the calculation.

FIG. 4 shows relationships between amounts of displacement and center coordinates. FIG. 4A is an image diagram showing the center coordinates indicating the reference position of each face part, with A and A' for the eyebrows, B and B' for the eyes, C for the nose and D for the mouth.

FIG. 4B is an image diagram showing the center coordinates calculated of each face part, with a and a' for the eyebrows, b and b' for the eyes, c for the nose and d for the mouth.

FIG. 4C shows specific examples of the amounts of horizontal-direction displacement calculated for individual face parts based on the center coordinates shown in FIGS. 4A and 4B.

FIG. 4D shows specific examples of the amounts of vertical-direction displacement calculated for individual face parts based on the center coordinates shown in FIGS. 4A and 4B. The information in the square brackets in FIG. 4D respectively refers to a name of a face part whose center coordinates are used as the fiducial point.

<Face-Part-Classification-Table Storage Subunit 1042>

The face-part-classification-table storage subunit 1042 stores therein face part classification tables for individual face parts.

Here, each of the "face part classification tables" refers to a table showing a correspondence relationship between a particular face part's calculated physical feature quantities and classification categories. Specifically speaking, this is a table used to determine a classification category of an extracted face part based on a correspondence relationship between the inclination and the ratio of the width of a part circumscribing rectangle of the extracted face part to its height (hereinafter, referred to as "width-height ratio"). According to the determined category, a portrait-face-part image data piece to be hereinafter described is selected for each face part.

As to a face part of hair, the category is determined by comparing the distribution pattern of pixel data of individual pixels in the hair region against the distribution patterns of pixel data of the hair regions of predetermined, multiple hair types.

FIG. 19 shows a specific example of a face part classification table of Face Part A.

<Face-Part-Reference-Position Storage Subunit 1043>

The face-part-reference-position storage unit 1043 stores therein center coordinates indicating a reference position of each face part extracted from face image data collected from standard people. The reference position of each face part is, for example, found by carrying out image processing on face image data obtained from multiple standard people, calculating positions of each face part based on the face image data of the individuals, and taking the average of the calculated positions for each face part.

FIG. 20 shows a specific example of center coordinates indicating the reference position of each face part. The individual center coordinates of FIG. 20 correspond to the center coordinates indicating the reference positions of the respective face parts shown in the image diagram of FIG. 4A.

<Facial Feature Extraction Unit 103>

Based on physical feature quantities input from the physical feature extraction unit 102, the facial feature extraction unit 103 determines the classification category for each of the extracted face parts, and further determines the amounts of horizontal- and vertical-direction displacement.

To be more specific, the facial feature extraction unit 103 calculates, with respect to each of the extracted face parts, a width-height ratio using the width and height of a corresponding part circumscribing rectangle; determines the classification category of the face part, referring to the face part classification table, based on the inclination of the extracted face part as well as the width-height ratio calculated for the face part; further determines the amounts of horizontal- and vertical-direction displacement based on the center coordinates of the extracted face part and the center coordinates of the reference position of the face part; and records, as individual feature information, the determined classification category and amounts of displacement for each face part in the facial feature storage unit 104.

<Expression Style Input Unit 105>

The expression style input unit 105 receives a specification for an expression style of a portrait from the user, and outputs this to the plot rule reading unit 107.

Here, the "expression style" refers to a portrait type. An animal-like portrait, a cartoon character-like portrait, and a portrait with facial expression (e.g. a portrait of an angry face, a smiling face, a crying face or a perplexed face) are examples of the expression styles. By specifying the expression style, the type of a portrait is determined, and thereby a plot rule, to be hereinafter described, stored in the plot rule storage unit 106 is specified.

Each plot rule is associated with a portrait type.

<Plot Rule Storage Unit 106>

The plot rule storage unit 106 stores therein plot rules, each of which is established with respect to a different portrait type.

Here, the "plot rule" refers to information including: portrait image data pieces of each face part (including size information, i.e. the width and height, of the face part); and portrait-face-part reference position information showing center coordinates indicating a reference position of each face part in the portrait image. As to a face part of face line, the portrait-face-part reference position information shows the width and height of the circumscribing rectangle in addition to the center coordinates.

Each plot rule includes, with respect to each face part, a group of multiple image data pieces for the classification categories. A classification category for each face part here is determined based on a similar classification criterion used for the face part classification table of the face part—i.e. the correspondence relationship between the inclination and the width-height ratio of the part circumscribing rectangle of a portrait face part. Then, a portrait-face-part image data piece corresponding to the determined classification category is assigned.

Herewith, with respect to each face part, it is possible to choose, from the group of multiple image data pieces included in each plot rule, an image data piece corresponding to a classification category determined by the facial feature extraction unit 103.

Figure 5:
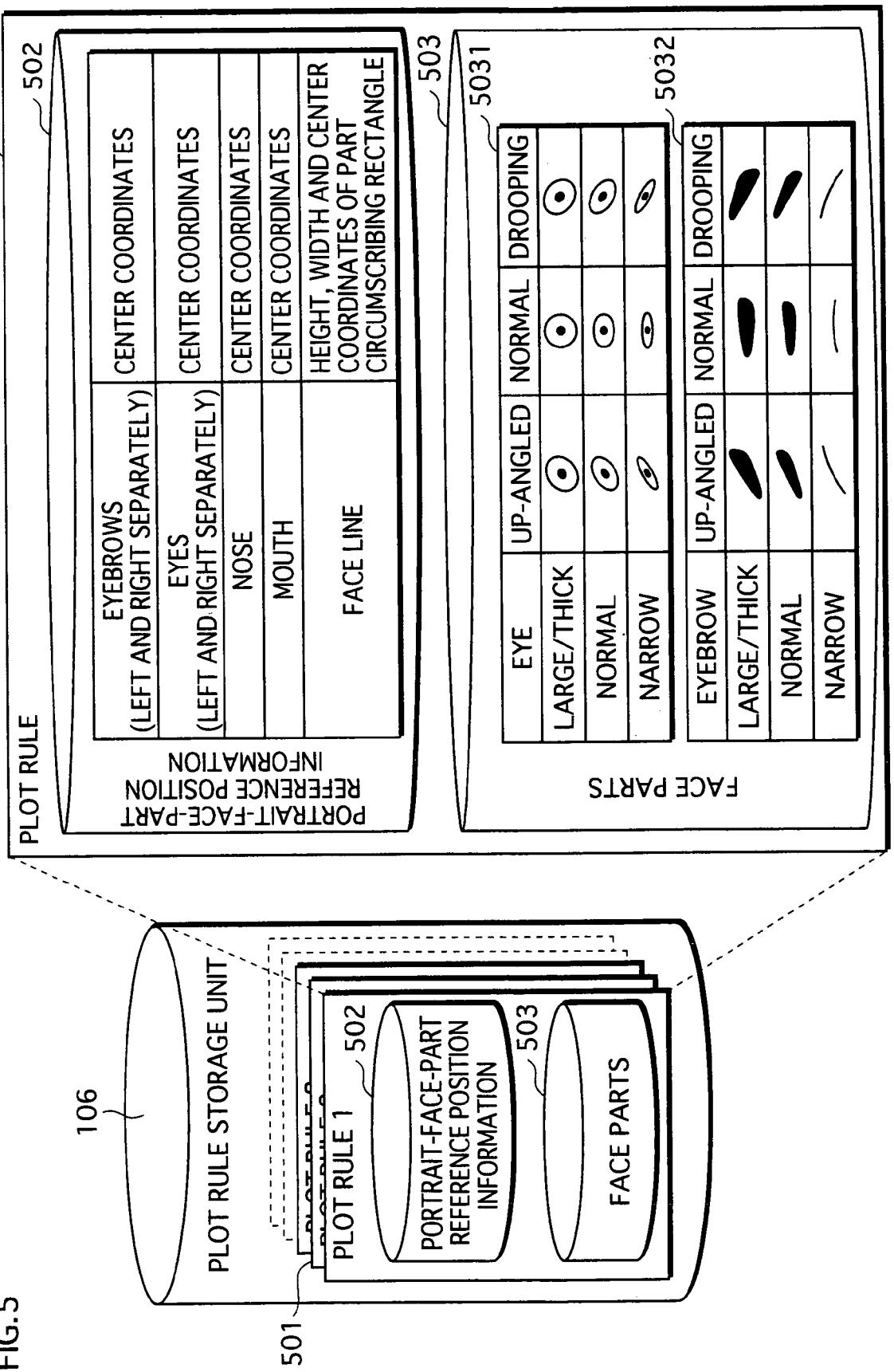
FIG. 5 shows a specific example of plot rules stored in a plot rule storage unit 106.

FIG. 5 shows a specific example of plot rules stored in the plot rule storage unit 106. Reference numeral 501 indicates a single plot rule, while reference numerals 502 and 503 indicate portrait-face-part reference position information and image data groups of respective face parts, respectively.

In addition, reference numeral 5031 of FIG. 5 indicates a group of image data pieces, each of which belongs to a different classification category of a face part of eyes. Reference numeral 5032 of FIG. 5 indicates a group of image data pieces, each of which belongs to a different classification category of a face part of eyebrows.

<Plot Rule Reading Unit 107>

After an expression style is specified via the expression style input unit 105 and a plot rule is determined, the plot rule reading unit 107 reads the determined plot rule from the plot rule storage unit 106 and outputs this to the portrait synthesis unit 108.

<Portrait Synthesis Unit 108>

The portrait synthesis unit 108 comprises: a portrait face part position calculation subunit 110; a portrait face part selection subunit 111; and a portrait face part positioning subunit 112.

<Face part position calculation subunit 110>

The face part position calculation subunit 110 determines a position of each portrait face part within the portrait image, in the horizontal and vertical directions. First, how to determine the position in the horizontal direction is described.

The face part position calculation subunit 110 obtains center coordinates indicating the reference position of each face part stored in the face-part-reference-position storage subunit 1043; determines center coordinates of face parts which are located at the rightmost, leftmost, topmost and bottommost points, respectively, on the Cartesian coordinates based on coordinate values of the obtained center coordinates; and calculates a width (W1) of a rectangle, each side of which includes therein a different set of the determined center coordinates. Note that the rectangle is hereinafter referred to as "center coordinate circumscribing rectangle A".

Next, the face part position calculation subunit 110 obtains portrait-face-part reference position information included in a determined plot rule stored in the plot rule storage unit 106; determines center coordinates of individual portrait face parts which are located at the rightmost, leftmost, topmost and bottommost points, respectively, on the Cartesian coordinates based on coordinate values of the center coordinates indicated by portrait-face-part reference position information, as in the same manner described above; and calculates a width (W2) of a rectangle, each side of which includes therein a different set of the determined center coordinates. Note that this rectangle is hereinafter referred to as "center coordinate circumscribing rectangle B".

Figures 6A, 6B, 6C:
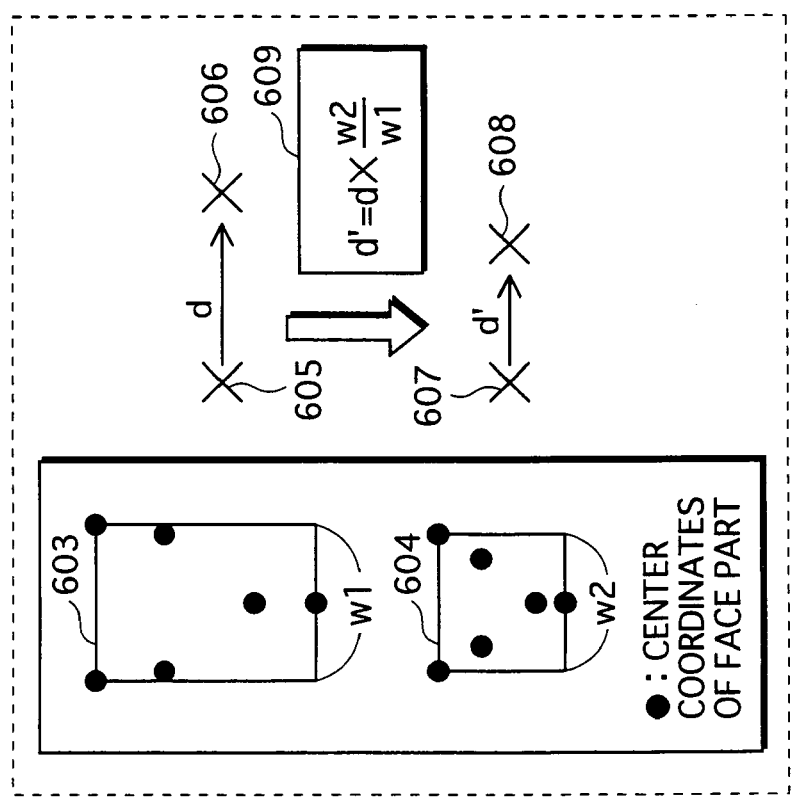
FIG. 6 illustrates a method of determining positions of portrait face parts, in the horizontal and vertical directions, in a portrait image.

Reference numeral 603 of FIG. 6B is a specific example of the center coordinate circumscribing rectangle A while reference numeral 604 being a specific example of the center coordinate circumscribing rectangle B. Each filled circle included in reference numerals 603 and 604 indicates center coordinates of an individual face part included in the corresponding center coordinate circumscribing rectangle.

Then, the face part position calculation subunit 110 obtains, with respect to each face part, the amount of horizontal-direction displacement stored in the facial feature storage subunit 1041; calculates an amount of displacement of a coordinate value in the horizontal direction by multiplying the obtained amount of horizontal-direction displacement by the ratio of the calculated W2 to the calculated W1, (W2/W1); and changes (adding or subtracting), by the calculated amount of displacement, the X-coordinate value of the center coordinates indicating the reference position of a corresponding portrait face part, to thereby determine the X-coordinate value of the center coordinates for placing the portrait face part in the portrait image.

Reference numeral 606 of FIG. 6B indicates center coordinates of a face part calculated as a physical feature quantity, while reference numeral 605 indicates center coordinates of a reference position, which is used for calculating the amount of horizontal-direction displacement of the former center coordinates. "d" indicates the amount of horizontal-direction displacement between these two center coordinates. Reference numeral 607 shows center coordinates indicating the reference position of a face part to make up the portrait image, while reference numeral 608 shows center coordinates indicating determined a position of the face part. "d'" shows the amount of horizontal-direction change of the coordinate values, and reference numeral 609 shows a formula for calculating d'.

FIG. 6C shows calculation formulae of d' for the individual portrait face parts. "d1" is an amount of horizontal-direction displacement for eyebrows; "d2" for eyes; "d3" for nose; and "d4" for mouth.

As to the center coordinates indicated by reference numerals 605 to 608, coordinate values in the vertical direction are set to the same value for convenience of explanation.

Next is described how to determine the position in the vertical direction.

The face part position calculation subunit 110 obtains an amount of vertical-direction displacement calculated for each face part and stored in the facial feature storage unit 104 as well as portrait-face-part reference position information included in a determined plot rule and stored in the plot rule storage unit 106. Then, the face part position calculation subunit 110 calculates an amount of displacement in the Y-coordinate value for each portrait face part by multiplying the obtained amount of vertical-direction displacement by a difference between (a) a Y-coordinate value of center coordinates indicating a reference position of a portrait face part corresponding to a face part whose center coordinates were used as a fiducial point to calculate the amount of vertical-direction displacement and (b) a Y-coordinate value of center coordinates indicating a reference position of a portrait face part corresponding to a face part targeted for the calculation of the amount of displacement. The former center coordinates are hereinafter referred to as "fiducial center coordinates", and they are, for example, the center coordinates of a portrait face part of eyes in the case where center coordinates of eyes were used as a fiducial point for the calculation. In addition, the difference between these two Y-coordinate values is hereinafter referred to as "vertical-direction difference". With respect to each portrait face part, the face part position calculation subunit 110 then determines, as the Y-coordinate value of the center coordinates for positioning the portrait face part in the portrait image, a Y-coordinate value that is found by changing the Y-coordinate value of the fiducial center coordinates for the portrait face part by the calculated amount of displacement.

Reference numeral 601 of FIG. 6A represents, in the case where the center coordinates of a portrait face part of eyebrows are used as the fiducial center coordinates, vertical-direction differences between the fiducial coordinates and center coordinates indicating reference positions of individual neighboring portrait face parts. Specifically speaking, "$\alpha$" represents a vertical-direction difference between the eyebrows and eyes; "$\beta$" between the eyebrows and nose; and "$\gamma$" between the eyebrows and mouth. Here, a vertical-direction difference between the eyes and nose, in the case of the center coordinates of eyes being used as the fiducial center coordinates, is expressed as ($\beta-\alpha$). In addition, in the case of the center coordinates of nose being used as the fiducial center coordinates, a vertical-direction difference between the nose and mouth is expressed as ($\gamma-\beta$)

In addition, reference numeral 602 of FIG. 6A indicates amounts of displacement in the Y-coordinate values calculated for the individual portrait face parts. Specifically speaking, "$\alpha'$" represents an amount of displacement in the Y-coordinate value for a portrait face part of eyes; "$\beta'$" for a portrait face part of nose; and "$\gamma'$" for a portrait face part of mouth.

$\alpha'$, $\beta'$ and $\gamma'$ are respectively found by the following equations:

$$\alpha' = \alpha \times (\text{an amount of vertical-direction displacement between eyebrows and eyes}) \quad [\text{Eq. 1}];$$

$$\beta' = \beta \times (\text{an amount of vertical-direction displacement between eyebrows and nose}) \quad [\text{Eq. 2}];$$

$$\gamma' = \gamma \times (\text{an amount of vertical-direction displacement between eyebrows and mouth}) \quad [\text{Eq. 3}];$$

$$\beta' - \alpha' = (\beta - \alpha) \times (\text{an amount of vertical-direction displacement between eyes and nose}) \quad [\text{Eq. 4}];$$

and $$\beta' - \beta' = (\gamma - \beta) \times (\text{an amount of vertical-direction displacement between nose and mouth}) \quad [\text{Eq. 5}].$$

Here, as to $\alpha'$, two different values may be found according to two equations of [Eq. 1] and [Eq. 4], and therefore the average of these two is taken as a final value of $\alpha'$. To be more specific, $\alpha'$ is calculated by the following equation:

$$\alpha' = \tfrac{1}{2}\{\alpha \times (\text{an amount of vertical-direction displacement between eyebrows and eyes}) + \beta' - (\beta - \alpha) \times (\text{an amount of vertical-direction displacement between eyes and nose})\} \quad [\text{Eq. 6}].$$

Note that $\alpha'$ may be calculated using either [Eq. 1] or [Eq. 4], instead of using [Eq. 6].

In a similar fashion, three values can be found for $\beta'$ according to three equations of [Eq. 2], [Eq. 4] and [Eq. 5], and therefore the average of the three is taken as a final value of $\beta'$. To be more specific, $\beta'$ is calculated by the following equation:

$$\beta' = \tfrac{1}{3}\{\beta \times (\text{an amount of vertical-direction displacement between eyebrows and nose}) + \alpha' + (\beta - \alpha) \times (\text{an amount of vertical-direction displacement between eyes and nose}) + \gamma' - (\gamma - \beta) \times (\text{an amount of vertical-direction displacement between nose and mouth})\} \quad [\text{Eq. 7}].$$

Note that $\beta'$ may be calculated using any one of [Eq. 2], [Eq. 4] and [Eq. 5], instead of using [Eq. 7].

In a similar fashion, two values can be found for $\gamma'$ according to two equations of [Eq. 3] and [Eq. 5], and therefore the average of the two is taken as a final value of $\gamma'$. To be more specific, $\gamma'$ is calculated by the following equation:

$$\gamma' = \tfrac{1}{2}\{\gamma \times (\text{an amount of vertical-direction displacement between eyebrows and mouth}) + \beta' + (\gamma - \beta) \times (\text{an amount of vertical-direction displacement between nose and mouth})\} \quad [\text{Eq. 8}].$$

Note that $\gamma'$ may be calculated using either [Eq. 3] or [Eq. 5], instead of using [Eq. 8].

<Portrait Face Part Selection Subunit 111>

The portrait face part selection subunit 111 reads classification categories determined for each face part and stored in the facial feature storage unit 104, and selects, from among image data groups of individual portrait face parts included in a plot rule input by the plot rule reading unit 107, image data pieces of portrait face parts which respectively correspond to the read classification categories.

<Portrait Face Part Positioning Subunit 112>

According to the selected image data pieces and determined center coordinates, the portrait face part positioning subunit 112 synthesizes a portrait image in which the individual portrait face parts are placed at their determined center coordinates, and outputs the synthesized portrait image to the image output unit 109.

<Image Output Unit 109>

The image output unit 109 outputs, to an external display apparatus (not shown), the portrait image input from the portrait synthesis unit 108, and causes the external display apparatus to display the portrait image.

[Operations]

<Portrait Creation Process>

Figure 7:
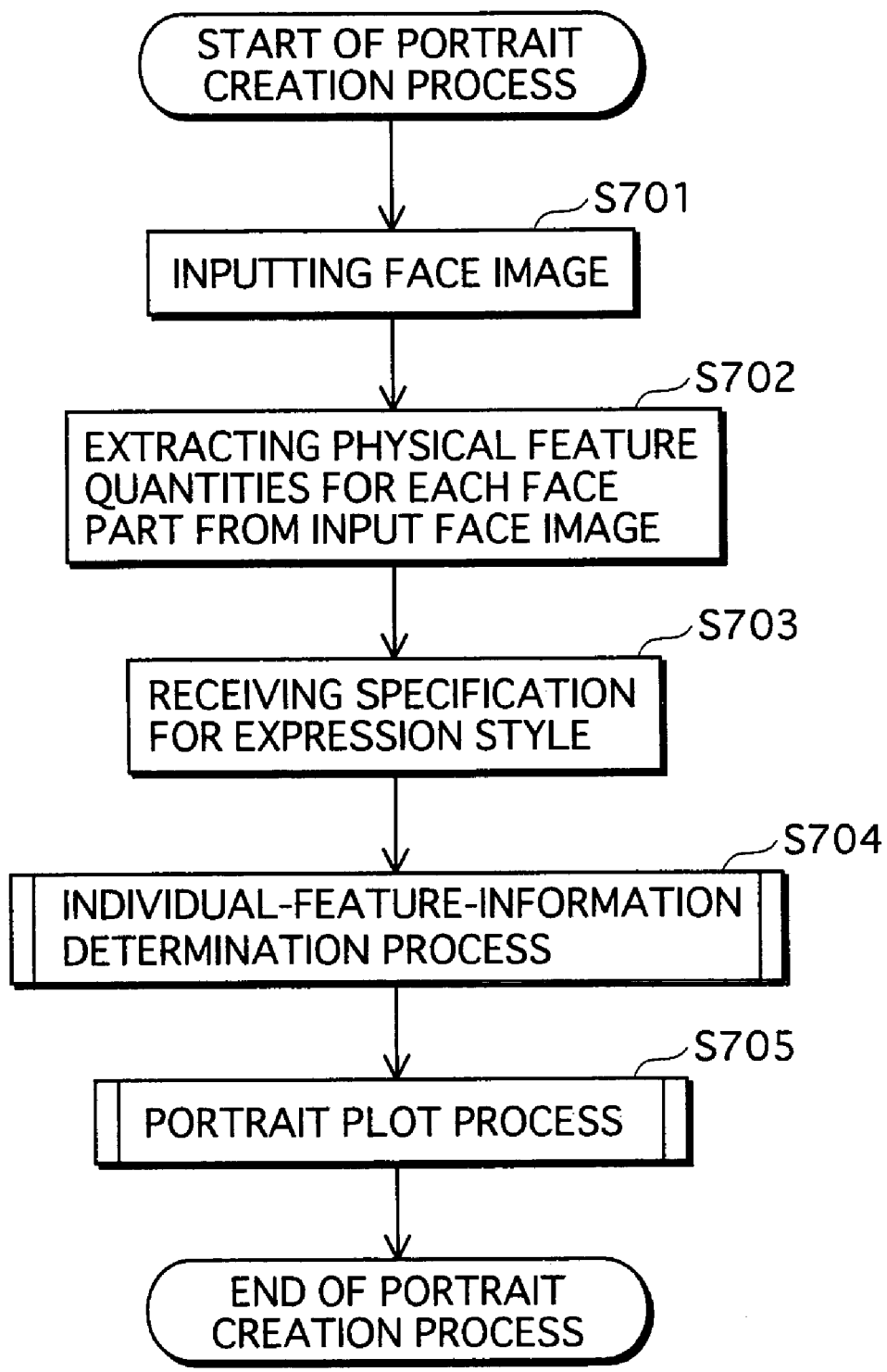
FIG. 7 is a flowchart showing operation of a portrait creation process performed by the face image creation device 100.

Next is described operation of a portrait creation process performed by the face image creation device 100. FIG. 7 is a flowchart showing this operation.

When face image data converted from a face image of a target person is input from the image input unit 101 (Step S701), the physical feature extraction unit 102 carries out image processing on the input face image data, extracts physical feature quantities for each face part (Step S702), and then outputs the physical feature quantities to the facial feature extraction unit 102.

Next, the expression style input unit 105 receives a specification for an expression style of a portrait from the user (Step S703), and outputs this to the plot rule reading unit 107.

Then, the facial feature extraction unit 103 carries out an individual-feature-information determination process to be hereinafter described (Step S704), and the plot rule reading unit 107 and portrait synthesis unit 108 perform a portrait plot process (Step S705) to be hereinafter described.

<Individual-Feature-Information Determination Process>

Figure 8:
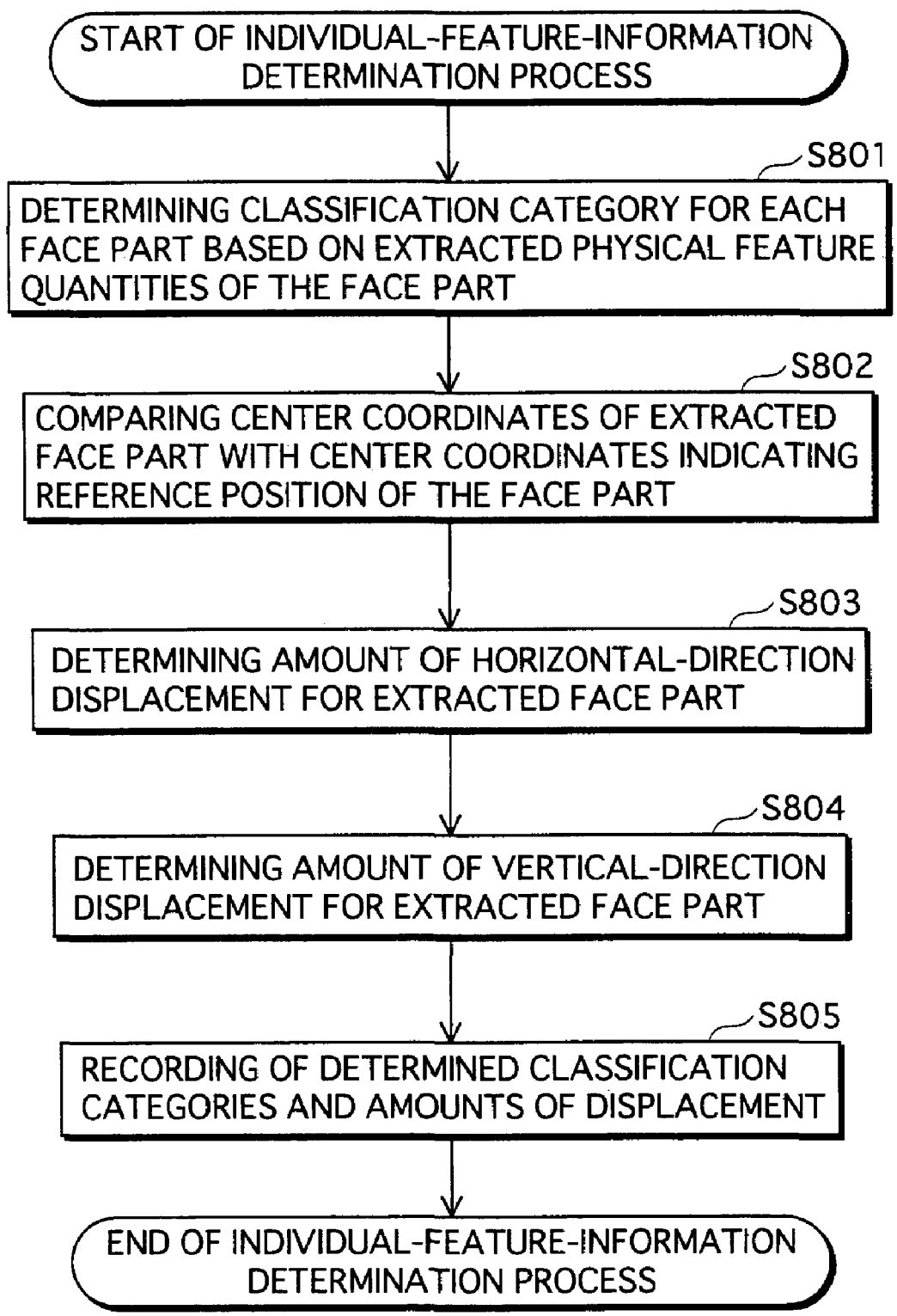
FIG. 8 is a flowchart showing operation of an individual-feature-information determination process performed by a facial feature extraction unit 103.

Next is described operation of the individual-feature-information determination process performed by the facial feature extraction unit 103. FIG. 8 is a flowchart showing this operation.

Based on the physical feature quantities of each face part extracted by the physical feature extraction unit 102, the facial feature extraction unit 103 determines a classification category with respect to each of the extracted face parts (Step S801); obtains center coordinates of the face part from the extracted physical feature quantities and compares the obtained center coordinates against center coordinates indicating a reference position of the face part (Step S802); determines amounts of horizontal- and vertical-direction displacement for the face part (Steps S803 and S804); and records, in the facial feature storage unit 104, the determined classification categories and the amounts of horizontal- and vertical-direction displacement (Step S805) as individual feature information.

<Portrait Plot Process>

Figure 9:
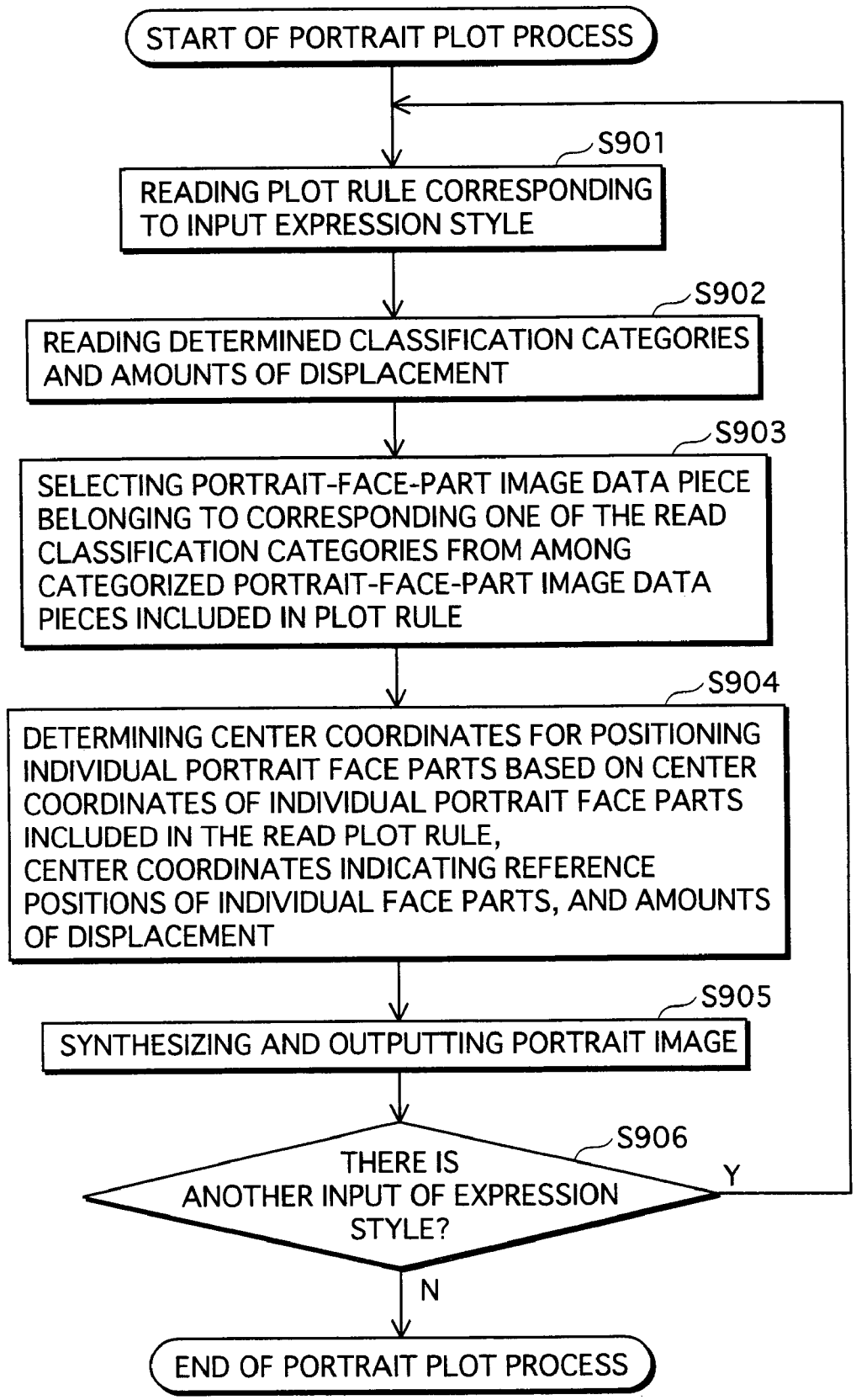
FIG. 9 is a flowchart showing operation of a portrait plot process performed by a portrait synthesis unit 108.

Next is described operation of the portrait plot process performed by the portrait synthesis unit 108. FIG. 9 is a flowchart showing this operation.

When an expression style specified via the expression style input unit 105 is input, the plot rule reading unit 107 reads a plot rule corresponding to the input expression style from the plot rule storage unit 106 (Step S901), and outputs the read plot rule to the portrait synthesis unit 108.

The portrait synthesis unit 108 reads the center coordinates indicating the individual face parts' reference positions stored in the facial feature storage unit 104, the classification categories determined for the individual face parts, and the amounts of horizontal-and vertical-direction displacement (Step S902); selects, with respect to each portrait face part, a portrait-face-part image data piece belonging to a corresponding one of the read classification categories from among categorized portrait-face-part image data pieces included in the read plot rule (Step S903); determines center coordinates for positioning the individual portrait face parts based on the center coordinates of the individual portrait face parts included in the read plot rule, the center coordinates indicating the reference positions of the individual face parts, and the amounts of horizontal- and vertical-direction displacement (Step S904); and synthesizes a portrait image in which each of the individual portrait face parts is placed at the determined center coordinate based on the selected image data pieces and determined center coordinates, and outputs the synthesized portrait image to the image output unit 109 (Step S905).

Next, the plot rule reading unit 107 judges whether there is another input of an expression style from the expression style input unit 105 (Step S906). If an expression style is input (Step S906: Y), the process is moved to Step S901.

2. Embodiment 2

The following explains the face image creation device 200 according to the present embodiment.

Figure 10:
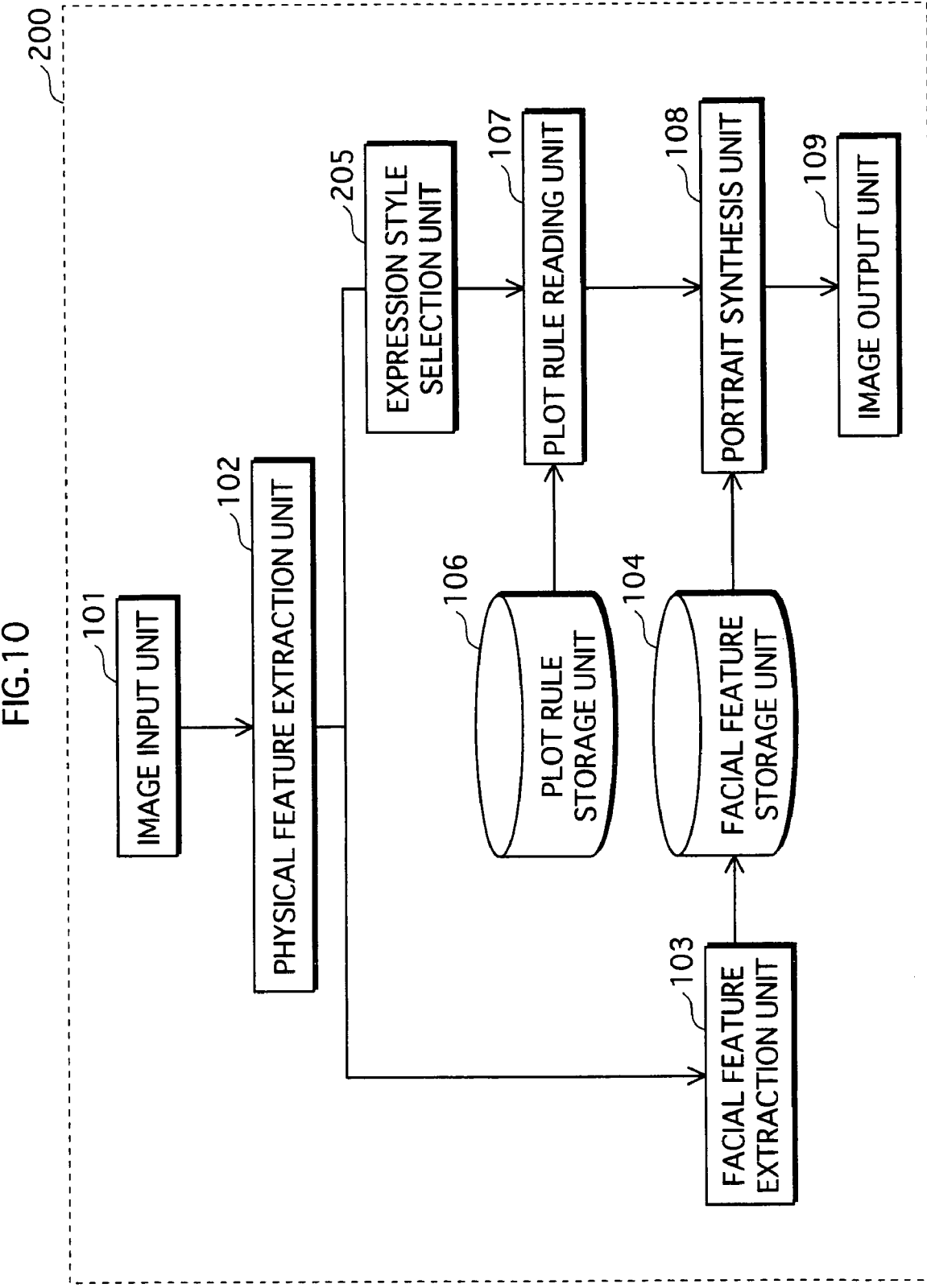
FIG. 10 is a functional block diagram showing a structure of a face image creation device 200.

FIG. 10 is a functional block diagram showing a structure of the face image creation device 200. The face image creation device 200 comprises: an image input unit 101; a physical feature extraction unit 102; a facial feature extraction unit 103; a facial feature storage unit 104; an expression style selection unit 205; a plot rule storage unit 106; a plot rule reading unit 107; a portrait synthesis unit 108; and an image output unit 109.

In the above structure, the same components as in the face image creation device 100 of Embodiment 1 are marked with the same reference numerals. The following explanation focuses on differences of the face image creation device 200 from the face image creation device 100, omitting description of the same components.

<Expression Style Selection Unit 205>

The expression style selection unit 205 carries out a process of selecting an expression style. In the process, using each face part's physical feature quantities extracted from multiple face images of the target person, each having a different expression, the expression style selection unit 205 calculates differences between expressions and compares the calculated differences against respective prestored reference values, or $V_R$s ($V_R1$ to $V_R4$, $V_R1 > V_R4 > V_R^2 > V_R3$).

Specifically speaking, the expression style selection unit 205 calculates a width-height ratio (h0/w0) using a width (w0) and height (h0) of a part circumscribing rectangle for a face part of eyes that is extracted from a first input face image of the target person, and obtains a width (w'0) of a part circumscribing rectangle for a face part of mouth. Subsequently, each time when a face image with a different expression is input, the expression style selection unit 205 calculates a width-height ratio for eyes (h1/w1) in a similar fashion, based on physical feature quantities extracted from the newly input face image, and also obtains a width (w'1) of a part circumscribing rectangle for mouth. Then, the expression style selection unit 205 respectively calculates differences of the width-height ratio for eyes (h1/w1) and the width of the part circumscribing rectangle for mouth (w'1) from those of the first input face image, i.e. (h1/w1−h0/w0) and (w'1−w'0), and determines an expression style to be selected based on the result of comparing the calculated differences with the prestored reference values.

[Operation]

<Portrait Creation Process>

Figure 11:
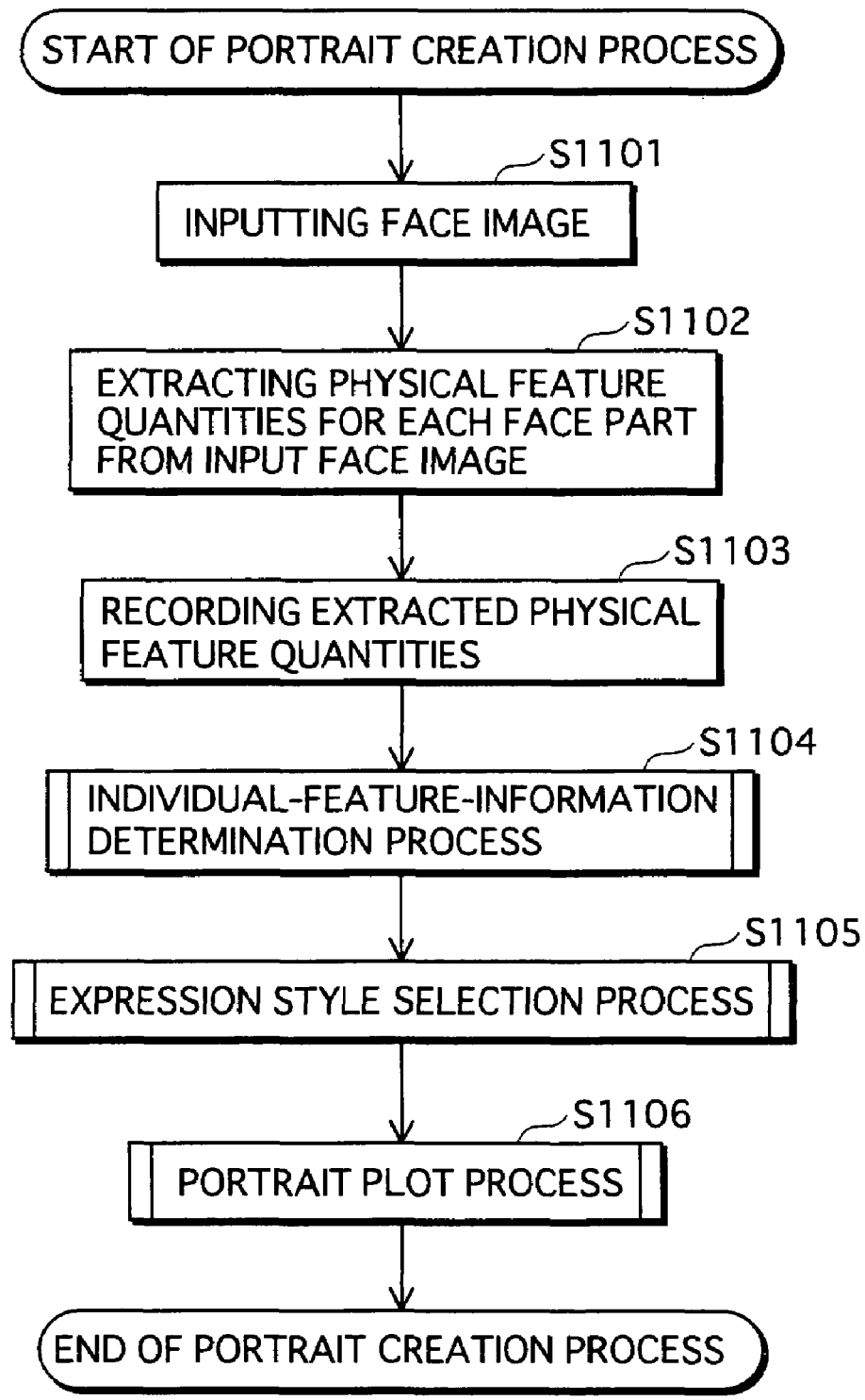
FIG. 11 is a flowchart showing operation of a portrait creation process performed by the face image creation device 200.

Next is described operation of a portrait creation process performed by the face image creation device 200. FIG. 11 is a flowchart showing this operation.

The operation of the portrait creation process performed by the face image creation device 200 is, as shown in FIG. 11, different from operation of the portrait creation process performed by the face image creation device 100 shown in FIG. 7 in selecting an expression style by not receiving an input of the expression style from the user, but carrying out an expression style selection process to be hereinafter described.

<Expression Style Selection Process>

Figure 12:
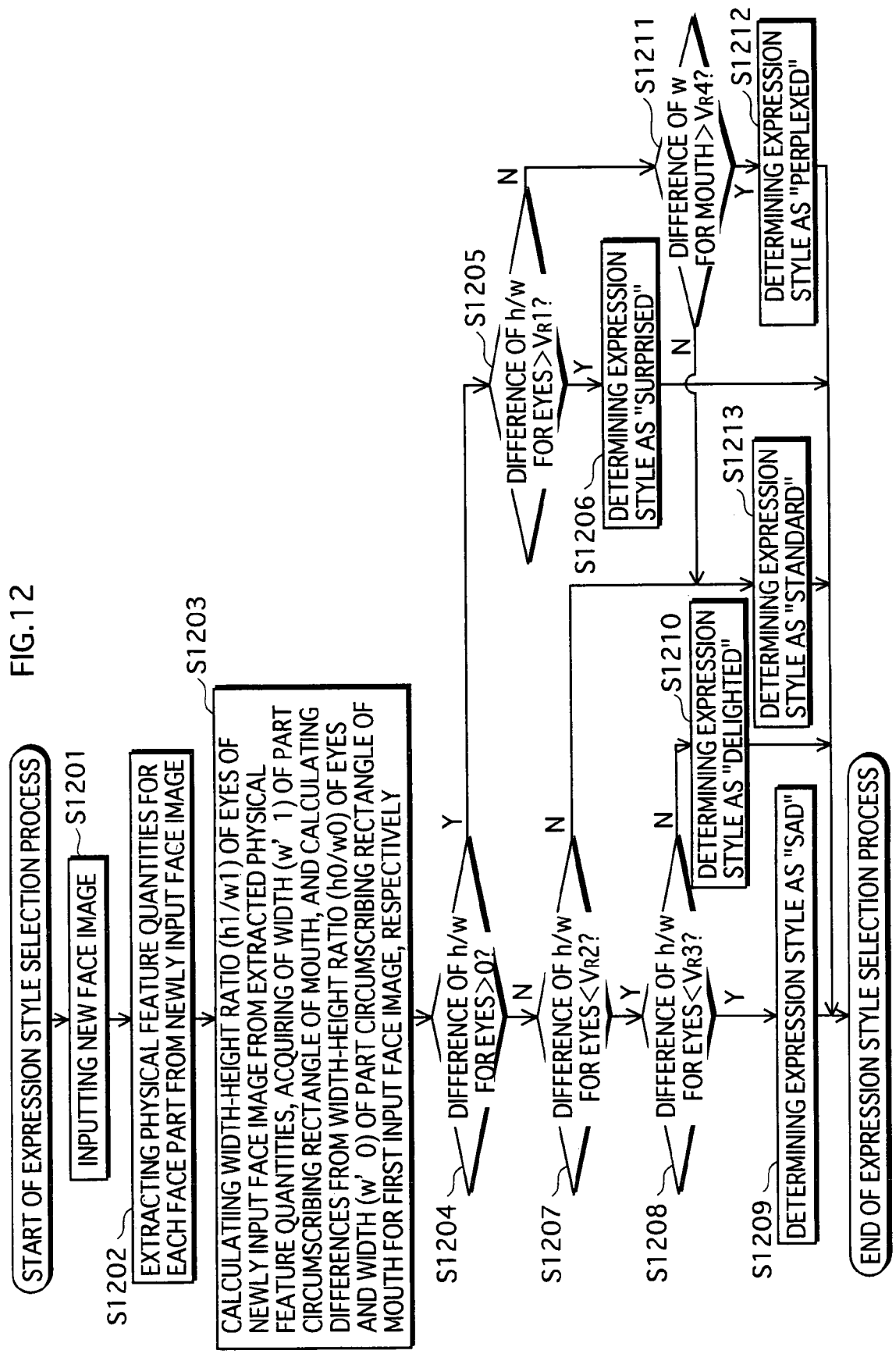
FIG. 12 is a flowchart showing operation of an expression style selection process performed by the face image creation device 200.

Next is described operation of the expression style selection process performed by the face image creation device 200. FIG. 12 is a flowchart showing this operation.

Here, the flowchart of FIG. 12 shows, for the sake of convenience for explanation, operation after the first face image of the target person has already been input by the image input unit 101, physical feature quantities have been extracted from the face image by the physical feature extraction unit 102, the width-height ratio for a face part of eyes has been calculated by the expression style selection unit 205, and the width of the part circumscribing rectangle of a face part of mouth has been obtained.

When there is another input of a face image of the target person from the image input unit 101 (Step S1201), the physical feature extraction unit 102 extracts physical feature quantities for each face part from the newly input face image (Step S1202) and outputs the extracted physical feature quantities to the expression style selection unit 205.

The expression style selection unit 205 calculates the width-height ratio (h1/w1) for a face part of eyes of the newly input face image from the extracted physical feature quantities, and also obtains the width (w'1) of the part circumscribing rectangle of a face part of mouth. Then, the expression style selection unit 205 calculates differences of the width-height ratio for eyes (h1/w1) and the width of the part circumscribing rectangle for mouth (w'1) from the width-height ratio (h0/w0) of a face part of eyes and the width (w'0) of the part circumscribing rectangle of a face part of mouth for the first input face image, respectively, i.e. (h1/w1−h0/w0) and (w'1−w'0), (Step S1203). If the calculated difference between the width-height ratios is larger than 0 (Step S1204: Y), the expression style selection unit 205 further judges whether the difference is larger than the prestored $V_R1$ (Step S1205). If it is larger than $V_R1$ (Step S1205: Y), the expression style selection unit 205 determines the expression style as "surprised" (Step S1206). When it is not larger than $V_R1$ (Step S1205: N), the expression style selection unit 205 judges whether the calculated difference between the widths is larger than the prestored $V_R4$ (Step S1211). When it is larger than $V_R4$ (Step S1211: Y), the expression style selection unit 205 determines the expression style as "perplexed" (Step S1212).

When the judgment of Step S1204 is negative (Step S1204: N), the expression style selection unit 205 judges whether the difference between the width-height ratios is smaller than the prestored $V_R2$ (Step S1207). If it is smaller than $V_R2$ (Step S1207: Y), the expression style selection unit 205 further judges whether the difference of the width-height ratios is smaller than $V_R3$ (Step S1208). When it is smaller than $V_R3$ (Step S1208: Y), the expression style selection unit 205 determines the expression style as "sad" (Step S1209). On the other hand, when it is not smaller than $V_R3$ (Step S1208: N), the expression style selection unit 205 determines the expression style as "delighted" (Step S1210).

In the case when the judgments of Steps S1207 and S1211 are respectively negative, the expression style selection unit 205 determines the expression style as "standard" (Step S1213).

<Portrait Plot Process>

Figure 13:
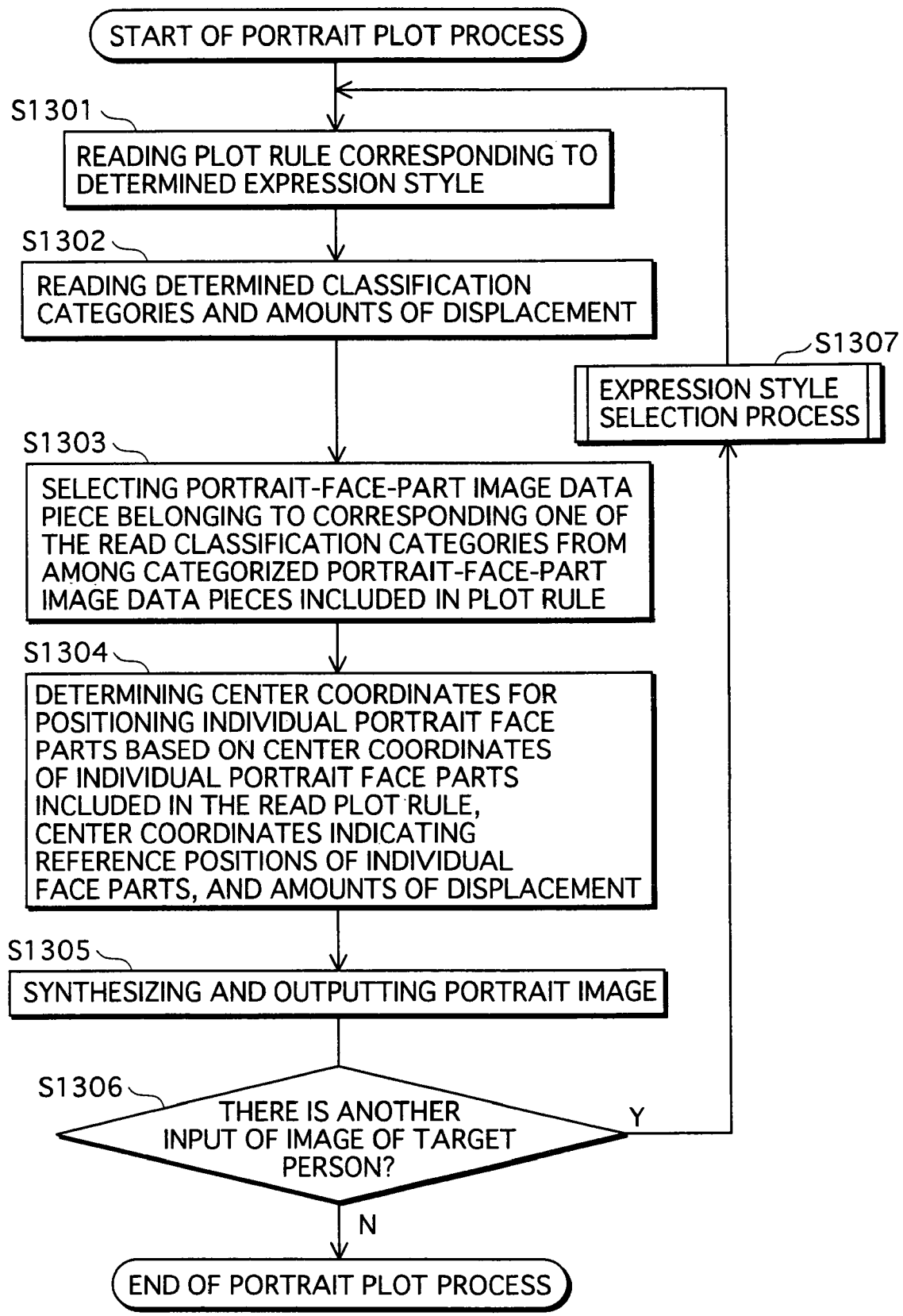
FIG. 13 is a flowchart showing operation of a portrait plot process performed by the face image creation device 200.

Next is described operation of a portrait plot process performed by the face image creation device 200. FIG. 13 is a flowchart showing this operation.

The plot rule reading unit 107 reads, from the plot rule storage unit 106, a plot rule corresponding to an expression style determined by the expression style selection unit 205 (Step S1301), and outputs the read plot rule to the portrait synthesis unit 108. Since processing of Steps S1302 to S1305 is the same as that of Steps S902 to S905 of FIG. 9, the explanation is left out here.

After processing of Step S1305 is carried out, the image input unit 101 judges whether there is another input of an image of the target person (Step S1306). If an image is input (Step S1306: Y), the face image creation device 200 repeats the expression style selection process shown in FIG. 12 (Step S1307).

[Additional Particulars]

Embodiments 1 and 2 according to the present invention have been described, however, it is a matter of course that the present invention is not confined to these embodiments.

(1) For example, in Embodiments 1 and 2, a single face image creation device extracts physical feature quantities from an input face image of the target person and synthesizes a portrait image based on the extracted physical feature quantities and the like. However, the process of extracting physical feature quantities and the process of synthesizing a portrait may be performed by different devices.

Figure 14:
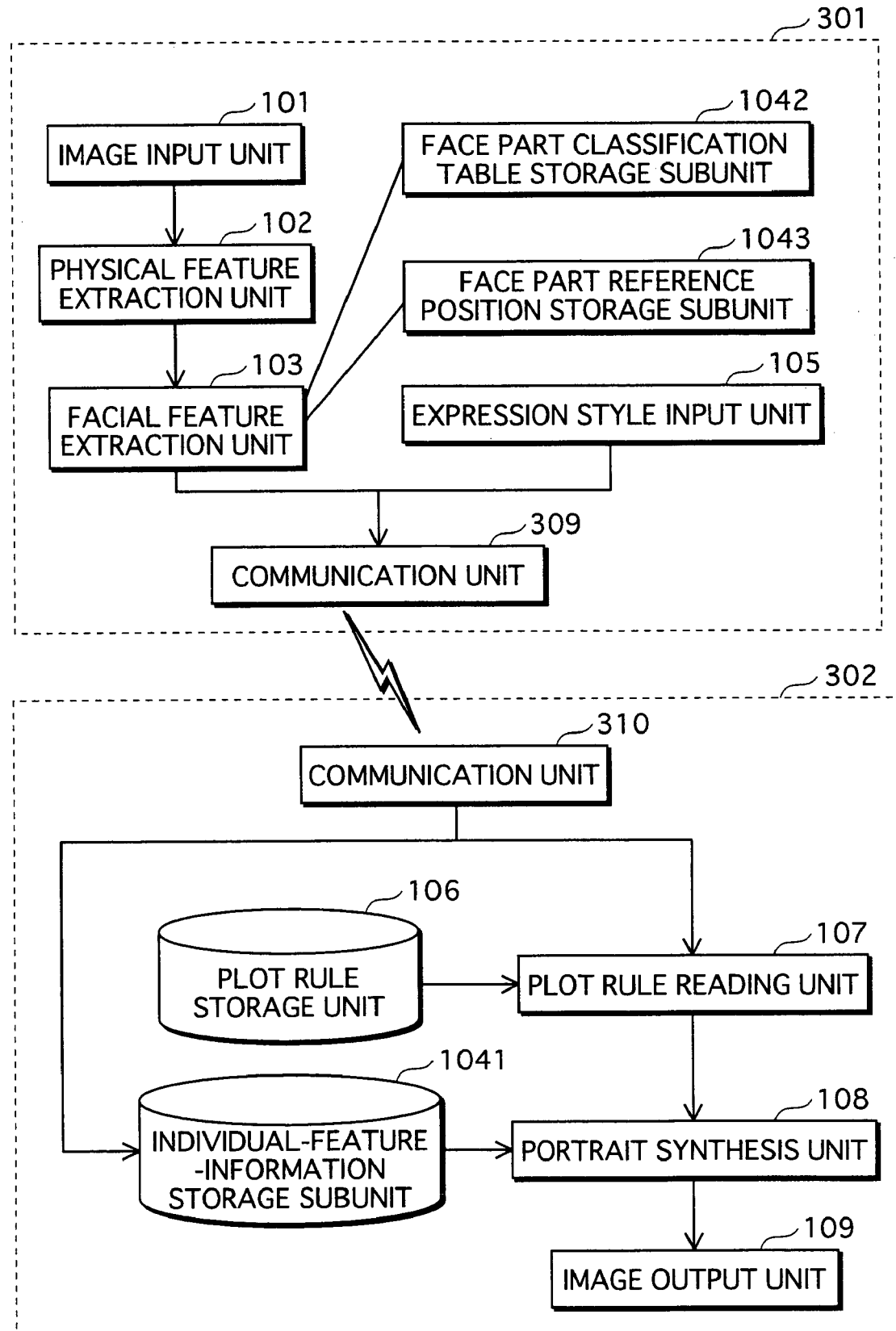
FIG. 14 shows a structure of a modified face image creation device.

Specifically speaking, the face image creation device may be composed of two separate devices, a portrait condition input device 301 and a portrait plot device 302, as shown in FIG. 14. In this case, the portrait condition input device 301 includes: the image input unit 101; the physical feature extraction unit 102; the facial feature extraction unit 103; the expression style input unit 105 (or the expression style selection unit 205); a communication unit 309; the face-part-classification-table storage subunit 1042; and the face-part-reference-position storage subunit 1043. The portrait plot device 302 includes: a communication unit 310; the plot rule storage unit 106; the individual-feature-information storage subunit 1041; the plot rule reading unit 107; the portrait synthesis unit 108; and the image output unit 109. Here, the portrait condition input device 301 transmits, to the portrait plot device 302 via the communication unit 309, individual feature information determined by the facial feature extraction unit 103 and a user-specified expression style output from the expression style input unit 105. The portrait plot device 302 synthesizes a portrait image based on the transmitted individual feature information and expression style, and transmits the synthesized portrait image to the portrait condition input device 301.

Figure 15:
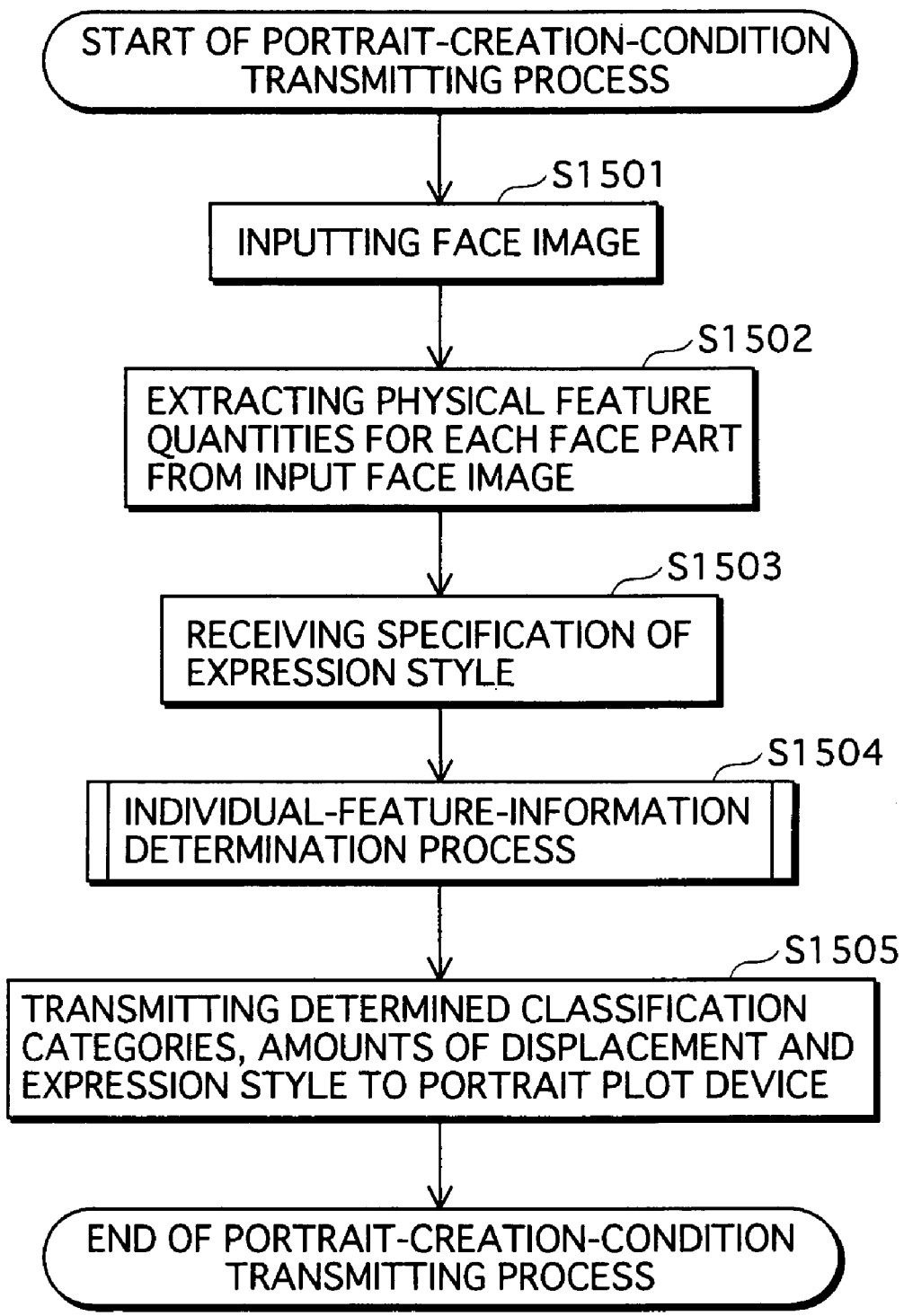
FIG. 15 is a flowchart showing operation of a portrait-creation-condition transmitting process performed by a portrait condition input device 301.

FIG. 15 is a flowchart showing operation of a portrait-creation-condition transmitting process performed by the portrait condition input device 301. Processing of Steps S1501 to S1504 of FIG. 15 is the same as that of Steps S701 to S704 of FIG. 7. After the processing of Step S1504, the communication unit 309 transmits, to the portrait plot device 302, the classification categories determined by the processing of Step S1504, the amounts of displacement, the user-specified expression style output from the expression style input unit 105 (Step S1505).

Figure 16:
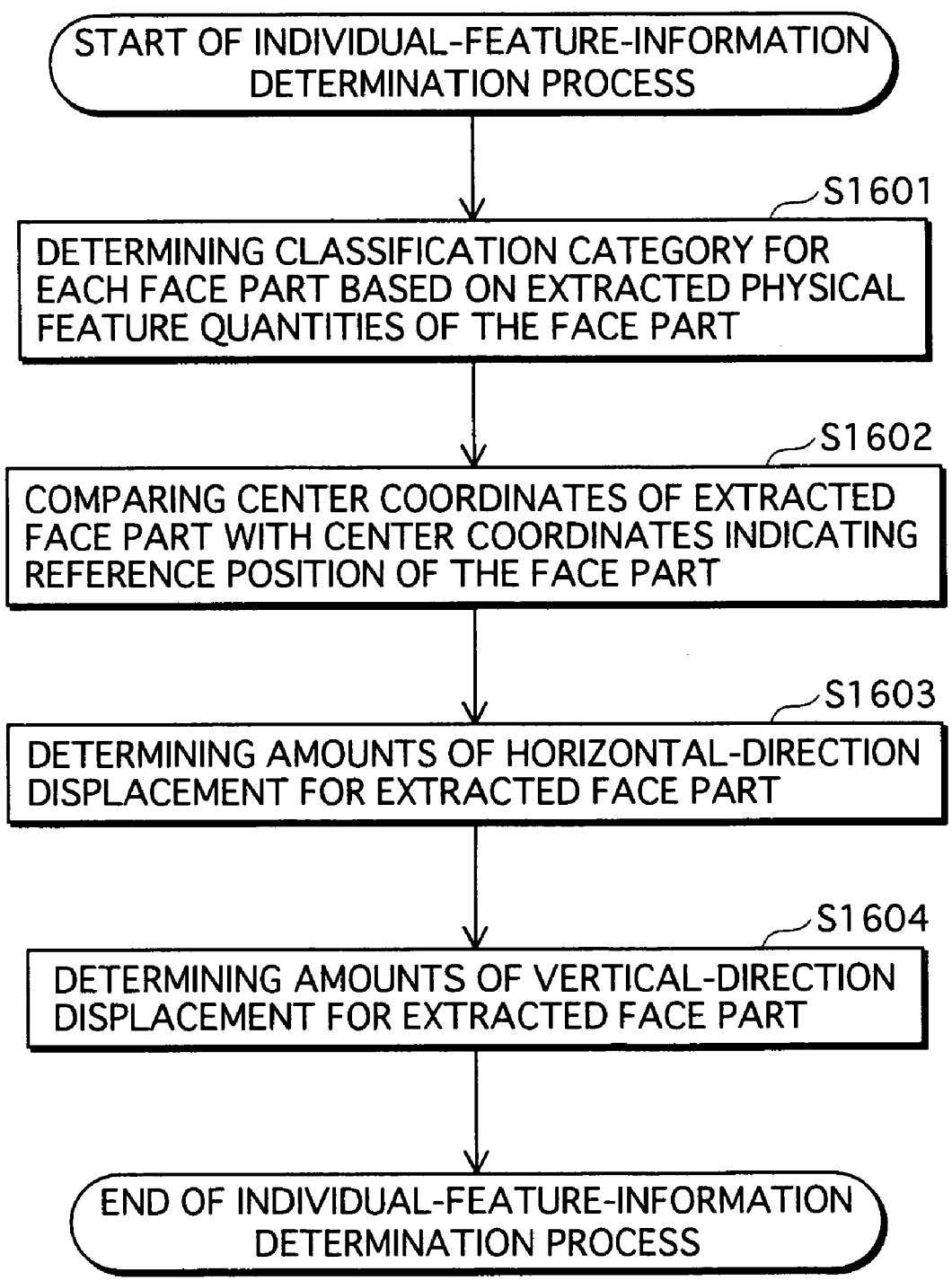
FIG. 16 is a flowchart showing operation of an individual-feature-information determination process performed by the portrait condition input device 301.

FIG. 16 is a flowchart showing operation of an individual-feature-information determination process performed by the portrait condition input device 301.

Processing of Steps S1601 to S1604 of FIG. 16 is the same as that of Steps S801 to S804 of FIG. 8.

Figure 17:
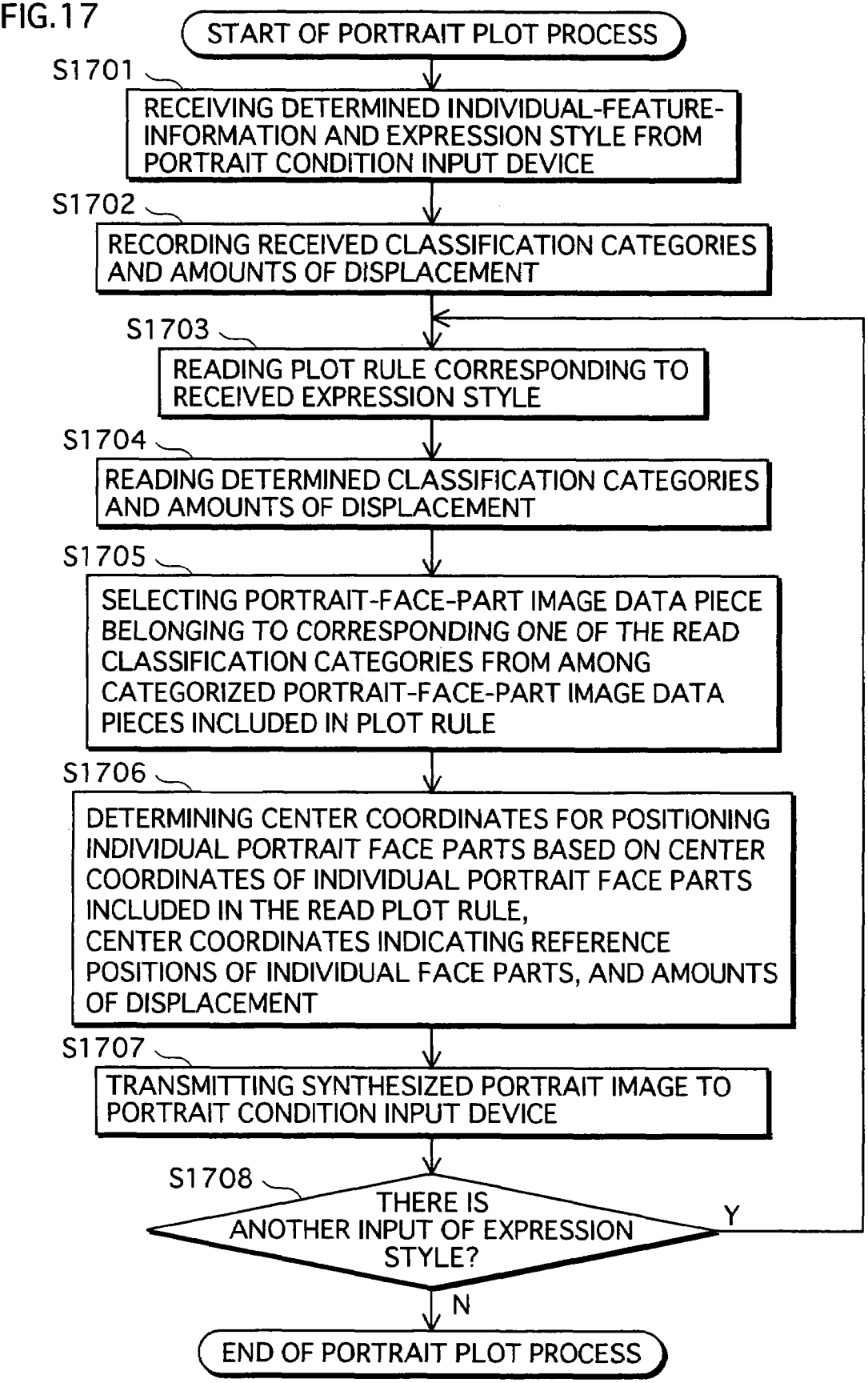
FIG. 17 is a flowchart showing operation of a portrait plot process performed by portrait plot device 302.

FIG. 17 is a flowchart showing operation of a portrait plot process performed by the portrait plot device 302. Processing of Steps S1704 to S1706 of FIG. 17 is the same as that of Steps S902 to S904 of FIG. 9.

In Step S1701, the communication unit 310 receives the determined individual feature information and the user-specified expression style from the portrait condition input device 301 and records the received individual feature information in the facial feature storage unit 104 (Step S1702).

Then, the portrait plot device 302 reads a plot rule corresponding to the received expression style from the plot rule storage unit 106 via the plot rule reading unit 107 (Step S1703), and subsequently performs the processing of Steps S1704 to S1706.

The portrait plot device 302 synthesizes, via the portrait synthesis unit 108, a portrait image in which individual portrait face parts are placed at the determined center coordinates based on the selected image data pieces and determined center coordinates, and transmits the synthesized portrait image to the portrait condition input device 301 (Step S1707). Then, the portrait plot device 302 judges whether there is another input of an expression style from the portrait condition input device 301 (Step S1708), and moves to the processing of Step S1703 if there is another input (Step S1708: Y).

(2) In the above section (1), the portrait condition input device 301 may be equipped with the expression style selection unit 205 in place of the expression style input unit 105. Here, the expression style selection unit 205 performs the output of an expression style, instead of the expression style input unit 105.

(3) The structure of which the face image creation device is divided into multiple devices may be different from one shown in the section (1). For example, one device may be formed with the plot rule storage unit 106 and plot rule reading unit 107, while another device may be formed with the image input unit 101, physical feature extraction unit 102, facial feature extraction unit 103, facial feature storage unit 104, expression style input unit 105, portrait synthesis unit 108 and image output unit 109. Here, data transmission and reception is performed via communication units as in the case described in the section (1).

Alternatively, one device may be formed with the image input unit 101, physical feature extraction unit 102 and facial feature extraction unit 103, while another device may be formed with the facial feature storage unit 104, expression style input unit 105, plot rule storage unit 106, plot rule reading unit 107, portrait synthesis unit 108 and image output unit 109. Here, data transmission and reception is performed via communication units as in the case described in the section (1).

Alternatively, three separate devices may be established, with one device including the image input unit 101, physical feature extraction unit 102 and facial feature extraction unit 103, a second device including the expression style selection unit 205, and a third device including the plot rule storage unit 106, facial feature storage unit 104, plot rule reading unit 107, portrait synthesis unit 108 and image output unit 109. Here, data transmission and reception is performed between each device via communication units as in the case described in the section (1).

(4) In addition, in Embodiment 2, the expression style selection unit 205 uses physical feature quantities extracted from the first input face image as subjects for the difference calculation, and calculates differences between these physical feature quantities and physical feature quantities extracted from each face image input at a subsequent time. However, physical feature quantities extracted from a face image other than the first-input face image may be used as the subjects for the difference calculation, and differences between these physical feature quantities and physical feature quantities extracted from other input face images may be calculated. Then, in this case, the process of selecting an expression style is performed by comparing the calculated differences with the respective prestored reference values, and the individual-feature-information determination process shown in Step S1104 of FIG. 11 is performed using the physical feature quantities used as the subjects for the difference calculation.

INDUSTRIAL APPLICABILITY

The present invention can be applied as technology for creating a new face image based on an input face image.

The invention claimed is:

1. A face image creation device for creating a first face image in which face parts for creating the first face image are respectively arranged at positions based on a position of a corresponding each of the face parts in a second face image, comprising:
    a reception unit operable to receive an input of the second face image;
    a position calculation unit operable to extract each of the face parts from the input second face image and calculate the position of each of the face parts in the second face image;
    a reference position storage unit storing a reference position of each of the face parts in a reference face image;
    a default position storage unit storing a default position of each of the face parts for creating the first face image in the first face image; and
    a position determining unit operable to determine the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

2. The face image creation device of claim 1, wherein the position determining unit includes:
    a displacement parameter determining subunit operable to determine a horizontal-direction displacement parameter, which is a distance in a horizontal direction between the calculated position of each of the face parts in the second face image and the reference position of a corresponding each of the face parts, and determine a vertical-direction displacement parameter, which is a ratio of (a) a distance in a vertical direction between the calculated position of one of the face parts and the calculated position of each of remaining face parts to (b) a distance in the vertical direction between the reference position of the one of the face parts and the reference position of the each of the remaining face parts; and
    a default position displacing subunit operable to determine, as each of the positions at which the face parts for creating the first face image are arranged, a position displaced from the default position of a corresponding each of the face parts, (i) in the horizontal direction, by a distance corresponding to a value obtained by multiplying the determined horizontal-direction displacement parameter of the corresponding each of the face parts by a ratio of a width of a circumscribing rectangle specified based on the default position of each of the face parts to a width of a circumscribing rectangle specified based on the reference position of each of the face parts, and (ii) in the vertical direction, so that a distance in the vertical direction between the default position of the one of the face parts and the default position of the each of the remaining face parts is changed to a distance corresponding to a value obtained by multiplying the distance in the vertical direction between the default positions by the vertical-direction displacement parameter determined for the one of the face parts and the each of the remaining face parts.

3. The face image creation device of claim 1, wherein the default position storage unit stores, with respect to each of a plurality of expression styles, a set of the face parts for creating the first face image and the default position of each of the face parts,
    the reception unit receives a plurality of inputs of a target person's face images with different facial expressions, and
    the face image creation device further comprising:
        an extraction unit operable to extract, from each of the input face images, physical feature quantities of the face parts making up the each of the input face images; and
        an expression style determining unit operable to select one of the input face images as the second face image, and determine an expression style for the face parts for creating the first face image, based on a comparison result between the physical feature quantities of the face parts making up the second face image and the physical feature quantities of the face parts making up each of remaining input face images, wherein the position determining unit determines the positions at which the face parts in the determined expression style for creating the first face image are arranged.

4. The face image creation device of claim 2, including a face image input subdevice and a face image plot subdevice, wherein the face image input subdevice includes:
the reception unit;
the position calculation unit;
the reference position storage unit;
the displacement parameter determining subunit;
  a 1st transmission unit operable to transmit the determined horizontal-direction and vertical-direction displacement parameters to the face image plot subdevice; and
a 1st receiving unit operable to receive the first face image transmitted from the face image plot subdevice, and
the face image plot device including:
a 2nd receiving unit operable to receive the determined horizontal-direction and vertical-direction displacement parameters;
the default position storage unit;
the default position displacing subunit;
a face image creation unit operable to create the first face image in which each of the face parts for creating the first face image are arranged at the position determined by the default position displacing subunit; and
  a 2nd transmission unit operable to transmit the created first face image to the face image input subdevice.

5. A face image creation method used in a face image creation device for creating a first face image in which face parts for creating the first face image are respectively arranged at positions based on a position of a corresponding each of the face parts in a second face image, wherein the face image creation device includes:
  a reference position storage unit storing a reference position of each of the face parts in a reference face image; and
  a default position storage unit storing a default position of each of the face parts for creating the first face image in the first face image, and
the face image creation method comprising steps of:
receiving an input of the second face image;
extracting each of the face parts from the input second face image and calculate the position of each of the face parts in the second face image; and
  determining the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

6. A computer readable recording medium storing thereon a program for causing a face image creation device for creating a first face image in which face parts for creating the first face image are respectively arranged at positions based on a position of a corresponding each of the face parts in a second face image, to execute a face image creation process, wherein the face image creation device includes:
  a reference position storage unit storing a reference position of each of the face parts in a reference face image; and a default position storage unit storing a default position of each of the face parts for creating the first face image in the first face image, and
the face image creation process comprising steps of:
receiving an input of the second face image;
extracting each of the face parts from the input second face image and calculate the position of each of the face parts in the second face image; and
determining the positions at which the face parts for creating the first face image are arranged, based on a comparison result between the calculated position of each of the face parts in the second face image and the reference position of a corresponding each of the face parts in the reference face image, and a comparison result of a distance between default positions with a distance between reference positions for particular two of the face parts.

7. The face image creation device of claim 2, wherein
the default position storage unit stores, with respect to each of a plurality of expression styles, a set of the face parts for creating the first face image and the default position of each of the face parts,
the reception unit receives a plurality of inputs of a target person's face images with different facial expressions, and
the face image creation device further comprising:
  an extraction unit operable to extract, from each of the input face images, physical feature quantities of the face parts making up the each of the input face images; and
  an expression style determining unit operable to select one of the input face images as the second face image, and determine an expression style for the face parts for creating the first face image, based on a comparison result between the physical feature quantities of the face parts making up the second face image and the physical feature quantities of the face parts making up each of remaining input face images, wherein
the position determining unit determines the positions at which the face parts in the determined expression style for creating the first face image are arranged.

8. The face image creation device of claim 3, including a face image input subdevice and a face image plot subdevice, wherein the face image input subdevice includes:
the reception unit;
the position calculation unit;
the reference position storage unit;
the displacement parameter determining subunit;
a 1st transmission unit operable to transmit the determined horizontal-direction and vertical-direction displacement parameters to the face image plot subdevice; and
a 1st receiving unit operable to receive the first face image transmitted from the face image plot subdevice, and
the face image plot device including:
a 2nd receiving unit operable to receive the determined horizontal-direction and vertical-direction displacement parameters;
the default position storage unit;
the default position displacing subunit;
a face image creation unit operable to create the first face image in which each of the face parts for creating the first face image are arranged at the position determined by the default position displacing subunit; and
a 2nd transmission unit operable to transmit the created first face image to the face image input subdevice.

* * * * *

UNITED STATES PATENT AND TRADEMARK OFFICE
CERTIFICATE OF CORRECTION

PATENT NO.        : 7,653,220 B2                                              Page 1 of 1
APPLICATION NO. : 10/594297
DATED             : January 26, 2010
INVENTOR(S)       : Nishimori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this

Twenty-third Day of November, 2010

David J. Kappos
*Director of the United States Patent and Trademark Office*